(12) United States Patent
Paul et al.

(10) Patent No.: US 10,748,060 B2
(45) Date of Patent: Aug. 18, 2020

(54) PRE-SYNAPTIC LEARNING USING DELAYED CAUSAL UPDATES

(71) Applicant: Intel Corporation, Santa Clara, CA (US)

(72) Inventors: Somnath Paul, Hillsboro, OR (US); Charles Augustine, Portland, OR (US); Muhammad M. Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 15/294,666

(22) Filed: Oct. 14, 2016

(65) Prior Publication Data

US 2018/0107922 A1    Apr. 19, 2018

(51) Int. Cl.
| | |
|---|---|
| *G06N 3/08* | (2006.01) |
| *G06N 20/00* | (2019.01) |
| *G06N 3/04* | (2006.01) |
| *G06N 3/063* | (2006.01) |

(52) U.S. Cl.
CPC .............. *G06N 3/08* (2013.01); *G06N 3/049* (2013.01); *G06N 3/063* (2013.01); *G06N 20/00* (2019.01)

(58) Field of Classification Search
CPC .......... G06N 3/08; G06N 3/063; G06N 20/00
See application file for complete search history.

(56) References Cited

U.S. PATENT DOCUMENTS

| | | | |
|---|---|---|---|
| 2013/0073491 A1* | 3/2013 | Izhikevich | ............. G06N 3/049 706/15 |
| 2013/0073497 A1 | 3/2013 | Akopyan et al. | |
| 2014/0214739 A1* | 7/2014 | Esser | ....................... G06N 3/10 706/44 |

(Continued)

FOREIGN PATENT DOCUMENTS

WO    2016/069334 A1    5/2016

OTHER PUBLICATIONS

Sen Song, Competitive Hebbian Learning Through Spike-Timing-Dependent Synaptic Plasticity, Mar. 21, 2000, University of California (Year: 2000).*

(Continued)

*Primary Examiner* — Robert A Cassity
*Assistant Examiner* — Tewodros E Mengistu
(74) *Attorney, Agent, or Firm* — Green, Howard & Mughal, LLP

(57) ABSTRACT

A processor or integrated circuit includes a memory to store weight values for a plurality neuromorphic states and a circuitry coupled to the memory. The circuitry is to detect an incoming data signal for a pre-synaptic neuromorphic state and initiate a time window for the pre-synaptic neuromorphic state in response to detecting the incoming data signal. The circuitry is further to, responsive to detecting an end of the time window: retrieve, from the memory, a weight value for a post-synaptic neuromorphic state for which an outgoing data signal is generated during the time window, the post-synaptic neuromorphic state being a fan-out connection of the pre-synaptic neuromorphic state; perform a causal update to the weight value, according to a learning function, to generate an updated weight value; and store the updated weight value back to the memory.

23 Claims, 13 Drawing Sheets

(56) References Cited

U.S. PATENT DOCUMENTS

| | | | |
|---|---|---|---|
| 2015/0052094 A1 | 2/2015 | Hunzinger et al. | |
| 2015/0294217 A1 | 10/2015 | Aparicio, IV | |
| 2016/0110640 A1* | 4/2016 | Arthur ................... | G06N 3/049 706/25 |
| 2016/0267378 A1 | 9/2016 | Eleftheriou et al. | |

OTHER PUBLICATIONS

Xin Jin, "Implementing Spike-Timing-Dependent Plasticity on SpiNNaker Neuromorphic Hardware" (Year: 2010).*

International Search Report and Written Opinion for PCT Application No. PCT/US2017/051899, 8 pages, dated Dec. 22, 2017.

Merolla et al., "A Million Spiking-Neuron Integrated Circuit with a Scalable Communication Network and Interface," Science, vol. 345, Issue 6197, 40 pages, Aug. 8, 2014.

Neftci et al., "Event-Driven Contrastive Divergence for Spiking Neuromorphic Systems," Frontiers in Neuroscience, vol. 7, Article 272, 14 pages, Jan. 30, 2014.

Seo et al., "A 45nm CMOS Neuromorphic Chip with a Scalable Architecture for Learning in Networks of Spiking Neurons," IEEE Custom Integrated Circuits CCICC, 4 pages, Sep. 19-21, 2011.

* cited by examiner

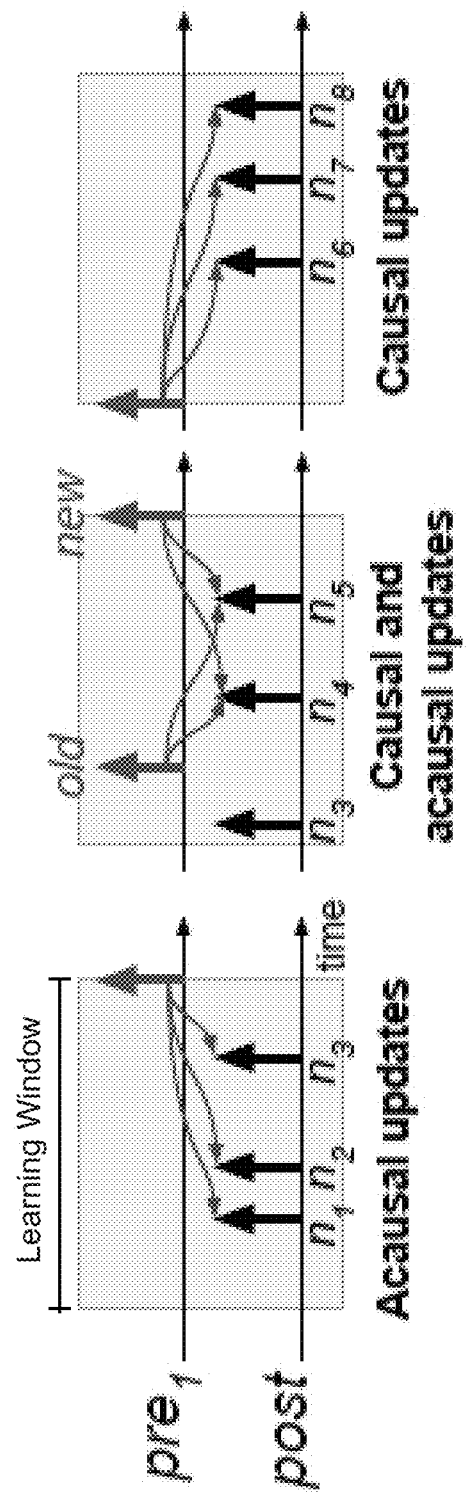

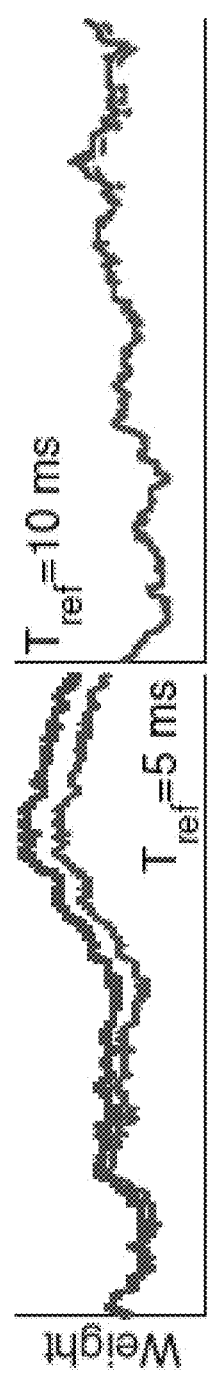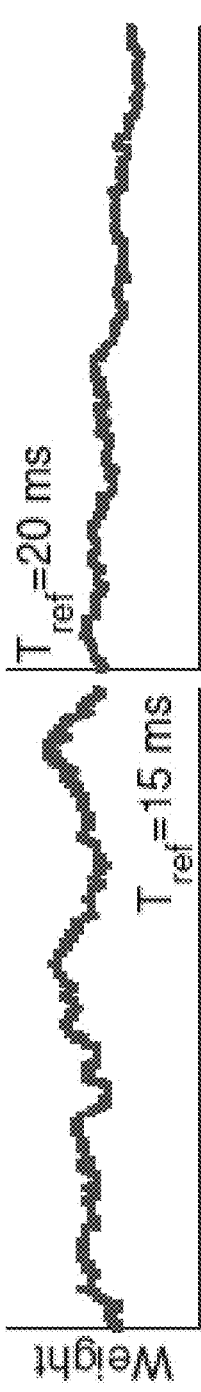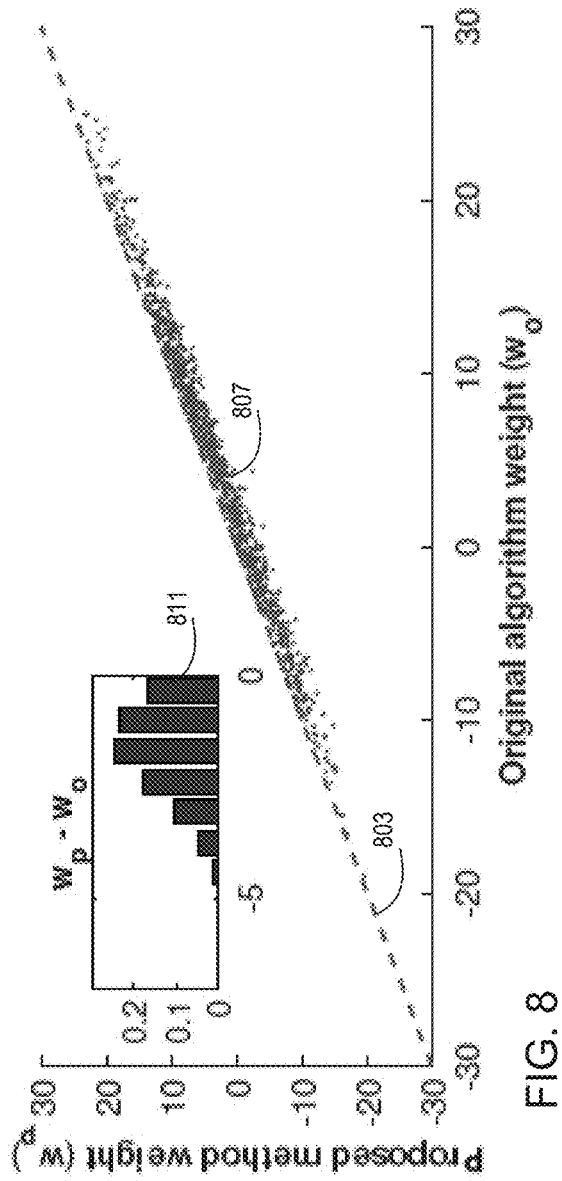

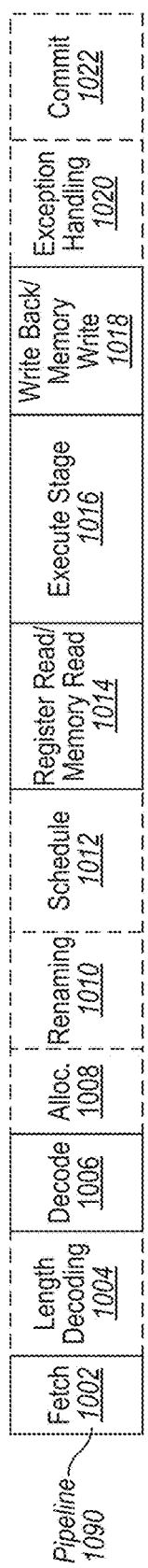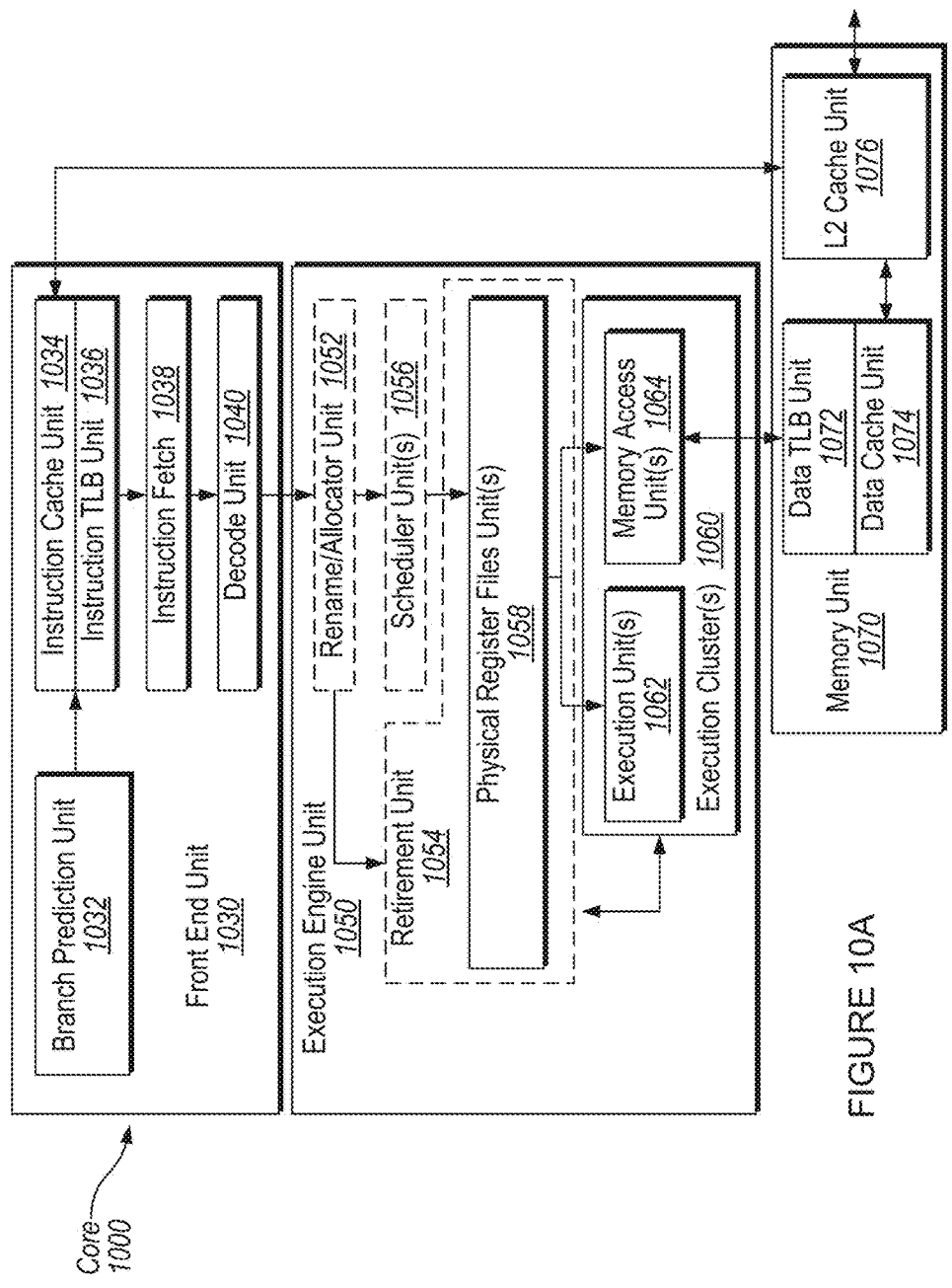

PRE-SYNAPTIC LEARNING USING DELAYED CAUSAL UPDATES

The present disclosure relates to the field neuromorphic computing and, in particular, to a circuit capable of pre-synaptic learning using delayed causal updates.

BACKGROUND

Neuron groups represent a core computation block in a neuromorphic computing system. The term "neuromorphic" refers to electronic circuitry designed to mimic neuro-biological architectures present in nervous systems to, in part, overcome parallel computation bottlenecks in machine learning systems. These systems are designed to process sensory data such as images and sounds and to respond to changes in data in ways not specifically programmed into the system. A "neuron" in a neuromorphic computing system is a neuromorphic state (or a group neuromorphic states) updated by the core computation block and encompasses an associated memory, which is sometimes called a synapse or synaptic memory.

BRIEF DESCRIPTION OF THE DRAWINGS

FIGS. 6A, 6B, and 6C are block diagrams of a time window during which acausal updates are performed, both causal and acausal updates are performed, and during which causal updates are performed, respectively, according to an embodiment of the present disclosure.

FIGS. 7A, 7B, 7C, and 7D are graphs illustrating convergence of two learning algorithms as a refractory period for outgoing data signal generation increases, according to an embodiment of the present disclosure.

FIG. 8 is a graph illustrating a comparison of the final weight values between the two algorithms of FIGS. 7A, 7B, 7C, and 7D, according to an embodiment of the present disclosure.

FIG. 10A is a block diagram illustrating an in-order pipeline and a register renaming stage, out-of-order issue/execution pipeline according to one embodiment.

FIG. 10B is a block diagram illustrating a micro-architecture for a processor that may perform operations of the processor core of FIG. 1.

DESCRIPTION OF EMBODIMENTS

Figure 1:
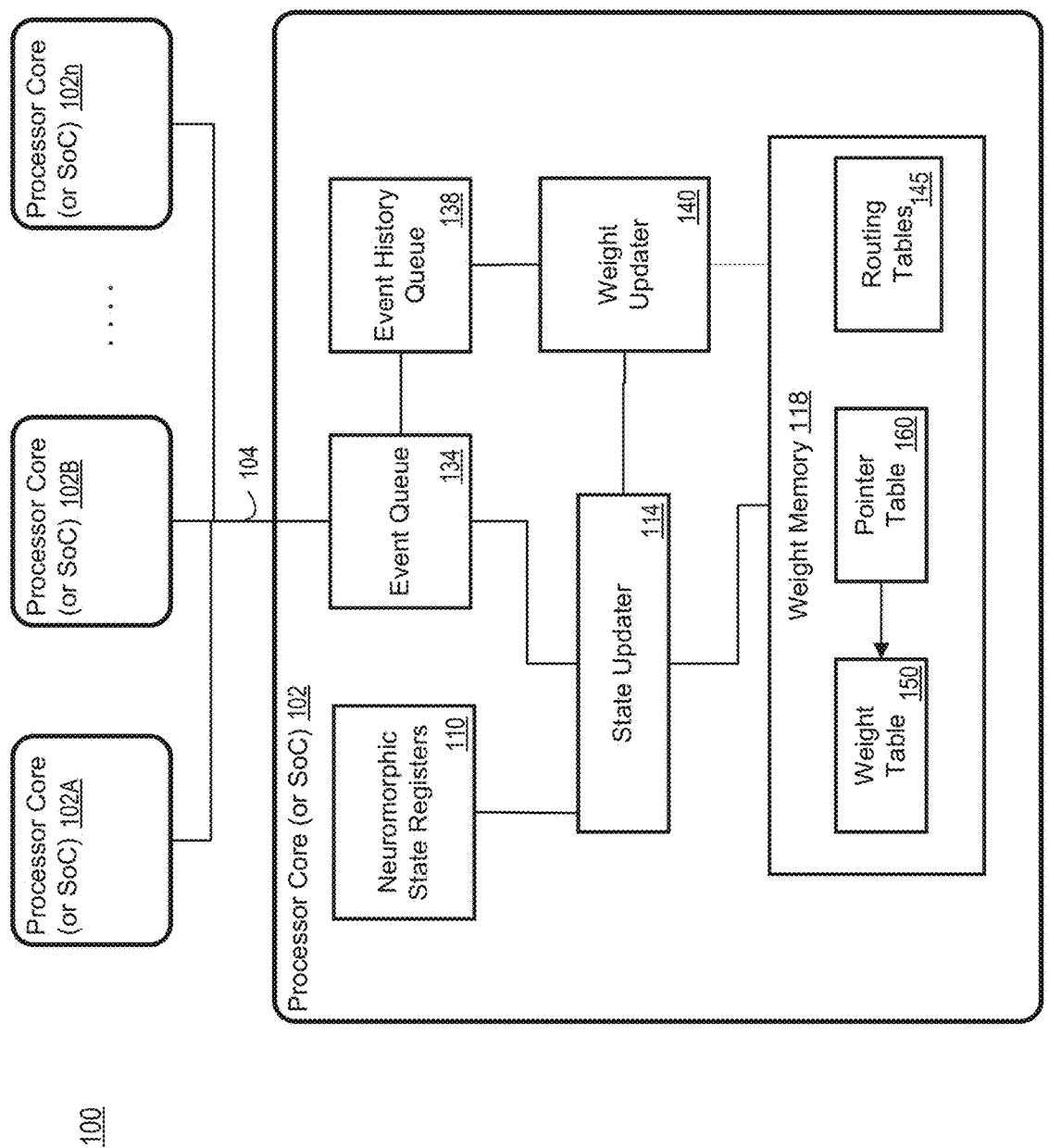
FIG. 1 is a block diagram of a neuromorphic computing system with details of a processor core, according to an embodiment of the present disclosure.

An artificial neural network (ANN) is a network of processing devices modeled after biological neural networks (the central nervous systems of animals, in particular the brain) that are used to estimate or approximate functions that can depend on a large number of inputs that are generally unknown. An ANN may be organized in layers. The layers may include a number of interconnected nodes that contain an activation function, such as logic that triggers activation of nodes in a certain order. A pattern (e.g., of an image, a sound, or the like) may be presented to the ANN via an input layer, which communicates to one or more processing layers (referred in the art as hidden layers) where the actual processing is done via a system of weighted connections, e.g., that include connection weights. Connection weights are weight values that define connections between nodes according to learning logic, as the ANN develops an identification of the input pattern. The processing layers may link to an output layer where the result is output to an output node. The learning logic may, therefore, modify the weight values of the connections according to previous learning applied to the input pattern. In a sense, the ANN may learn by example, e.g., learn to recognize an object or sound based on similarities of that object or sound to prior learned known objects or sounds.

A neuromorphic computing system (hereinafter "system") maps different ANN topologies as dictated by application and workload demands. An ANN topology refers to the way nodes of an ANN are interconnected and through which data flows (e.g., a feedforward neural network, different kinds of radial basis functions (RBF) networks, or the like). To perform this mapping to an ANN topology, the system endeavors to adapt the parameters driving these systems such as to achieve the best possible performance. These parameters refer to the various factors that impact the arithmetic computations within neurons, which are determining updates to neuromorphic states. The system may be made up of a series of processor cores (or other integrated circuits) to implement the nodes of the ANN topology mapping. The processor cores allow the distribution of processing a learning algorithm in a way similar to a biological brain. Each processor core may include a number of neurons, each represented as one or more neuromorphic states. For simplicity, therefore, a neuron is referred to herein as a neuromorphic state, although it should be understood that there may be more than one neuromorphic state for each neuron.

In one embodiment, the system may perform spike-timing dependent plasticity (STDP)-based learning. STDP is a temporally asymmetric form of Hebbian learning induced by tight temporal correlations between the spikes of pre-synaptic and fan-out-connected post-synaptic neuromorphic states. Fan-in and fan-out neuromorphic states are with reference to neighboring neuromorphic states for which adapting connection weights performs the learning. The term "spike," making analogy to an action potential in biological systems, refers to a data signal that identifies at least one neuromorphic state, and will be referred to herein as a "data signal" or just "signal" for simplicity of discussion. A pre-synaptic neuromorphic state is a neuromorphic state that sends an output signal to its fan-out connected neuromorphic states that are weighted through connection weights. A post-synaptic neuromorphic state is a neuromorphic state that receives the signal and associated weights from its fan-in connected neuromorphic states (pre-synaptic neuromorphic states). If a pre-synaptic neuromorphic state generates signals earlier than a post-synaptic neuromorphic state, then the likelihood that the pre-synaptic signal induced the signaling activity of post-synaptic neuromorphic state is high, and thus has a causal relationship. In contrast, the pre-synaptic signals happening later than a post-synaptic signal has an acausal relationship as the pre-synaptic signals do not contribute to the post-synaptic neuromorphic state's signaling activity.

Accordingly, inputs that might be the cause of the post-synaptic neuromorphic state's excitation are made even more likely to contribute in the future, whereas inputs that are not the cause of the post-synaptic signal are made less likely to contribute in the future. Noting these correlations makes up the learning process. Learning algorithms have until now have required a bi-directional weight update, e.g., an update to connection weights in the event of both a pre-synaptic neuromorphic state signal and a post-synaptic neuromorphic state signal. In the event of a post-synaptic signal, the weight value of a connection weight is increased if there is a pre-synaptic signal in a current learning time window (hereinafter "time window"), which is termed a causal update. In the event of a pre-synaptic signal, however, the weight value is decreased if there was a post-synaptic signal in a preceding time window, which is term an acausal update.

So, for example, for pre-synaptic neuromorphic states in acausal updates, the information of fan-out post-synaptic neuromorphic states is available in synaptic memory (hereinafter "weight memory"). Making information of fan-in pre-synaptic neuromorphic states available to post-synaptic neuromorphic states for causal updates is more complicated, however, due to retrieval of reverse fan-in information. In one embodiment, memory-intensive crossbar arrays are used within weight memory to ensure the ability to lookup the pre-synaptic fan-in information for causal updates. This can be a more expensive approach, particularly in sparsely connected ANNs. For example, in crossbar memory architecture, a bit location in memory can be accessed horizontally, using row addresses, as well as vertically, using column addresses. In the present example a crossbar-based memory would include all pre-synaptic neuromorphic states ordered in one direction while all post-synaptic neuromorphic states are ordered in another direction. Requiring this many memory locations makes the memory more expensive and slower to access.

To avoid the requirement for a reverse, fan-in look up in memory for making causal updates, the present architecture provides for delaying causal updates so as to employ forward-looking accesses to memory for pre-synaptic connection weights. This may be performed by defining a time window for each neuromorphic state when that neuromorphic state spikes, e.g., when an incoming data signal is received for a pre-synaptic neuromorphic state and upon generation of an outgoing data signal for a post-synaptic neuromorphic state. In one embodiment, a hardware queue may be used for time window tracking, for example, in which pre-synaptic signal and post-synaptic signal events flow through the queue within a time window. In one example, the time window is partitioned by time steps. The term "time step" refers to a period of time defined by a certain number of clock cycles, typically in a millisecond time range. In one embodiment, the hardware queue may be implemented with a set of counters. For example, each neuromorphic state may be assigned a counter that is initialized to a start value upon the neuromorphic state spiking, and may be decremented upon each time step, until being reset upon the neuromorphic state exiting the time window or signaling again.

In one embodiment, the delay in making the causal updates may be performed by tracking the time window over a number of time steps, and perform the causal updates to the fan-out post-synaptic neuromorphic states upon its pre-synaptic neuromorphic state reaching an end of the time window, in lieu of performing causal updates at the time the pre-synaptic neuromorphic state signals. At that moment, upon inspecting fan-out information of the pre-synaptic neuromorphic state, any post-synaptic signals that have been generated during the time window will become candidates for a causal update. For this update, the system may store the fan-out information for each neuromorphic state without a requirement for a reverse look-up of fan-in information. Furthermore, upon receipt of a second signal of the pre-synaptic neuromorphic state before the first signal exits the time window, the causal updates may be performed immediately, follow by performance of the acausal updates. This timing and order of updates may avoid losing a weight update based on the first incoming signal of the pre-synaptic neuromorphic state when its counter resets in response to receipt of the second signal for the pre-synaptic neuromorphic state.

Because reverse look-ups may be eliminated, an index-based memory architecture may be employed as an alternative to a crossbar memory architecture, e.g., where pre-synaptic neuromorphic states are indexed against post-synaptic neuromorphic states. As will be discussed in more detail, index-based memory architecture facilitates memory compression in which weight memory is used for existing neural connections and not for those that do not exist. In one embodiment, the indexing may be performed via a weight table in the weight memory. Accordingly, an index-based architecture may be a more optimized approach for sparse representations or non-systematic connectivity patterns between neuromorphic states, e.g., where each neuromorphic state connects to a different number of neuromorphic states inside of the same processor core.

FIG. 1A is a block diagram of a neuromorphic computing system 100 (hereinafter system 100), according to an embodiment of the present disclosure. The system 100 may include a plurality of processor cores 102, 102A, 102B, . . . 102n interconnected with a communication bus 104. In other embodiments, the processor cores are integrated circuits or systems on a chip (SoC). The displayed processor cores are representative of dozens of processor cores that may be networked in a distributed fashion with which to map an artificial neural network (ANN) topology, as discussed. The displayed processor cores 102, 102A, 102B, . . . 102n, in one embodiment, may be understood to be nearest neighbor processor cores and thus be those likely to send and receive data signals from spiking neuromorphic states of the processor cores. Accordingly, neuromorphic states from a nearest neighbor processor core may make up the fan-out or fan-in neuromorphic states for another nearest neighbor processor core.

In one embodiment, a processor core 102 of the plurality of processor cores may include a set of neuromorphic state registers 110, a state updater 114, a weight memory 118, an event queue 134, an event history queue 138, and a weight updater 140. The weight memory 118 may include a routing table 145, a weight table 150, and a pointer table 160.

The neuromorphic state registers 110 may include a multiple sets of registers, one set of registers for each group of neuromorphic states (e.g., a neuron). In one example, the processor core 102 may include registers and updating capability for 32, 64, or 128 groups of neuromorphic states (or some other number of groups of neuromorphic states). For example, a set of neuromorphic state registers may store a group of neuromorphic states that define behavior of a neuron, including defining how frequently the neuron is updated and other state parameters that drive employment of a learning algorithm with the mapped ANN. The state parameters may also include membrane potential, counter values (e.g., that drive a refractory period), control bits, signal threshold values and spike rates, among others. A refractory period is a set number of time steps between which a neuron cannot generate another outgoing data signal.

In various embodiment, the state updater 114 may perform updates to the state parameters of a group of neuromorphic states during a time step, and then rotate updates to other groups of neuromorphic states that are involved in signaling activity (whether pre-synaptic or post-synaptic signaling). The updating of state parameters may, in some cases, involve a connection weight stored in the weight memory 118.

The event queue 134 may be a part of an input/output interface of the processor core 102. The event queue 134 may include a hardware memory buffer or the like to buffer incoming data signals and outgoing data signals while in transition between processor cores.

The event history queue 138 may include hardware for use in tracking a time window for each neuromorphic state. For example, the time window may be initiated upon receipt of an incoming data signal for a pre-synaptic neuromorphic state or upon generation of an outgoing data signal for a post-synaptic neuromorphic state. In one embodiment, the event history queue 138 is implemented as a series of first-in, first-out (FIFO) buffers or other type of hardware buffer. In another embodiment, the event history queue 138 is implemented with timers such as a set of counters. For example, each neuromorphic state (or group of neuromorphic states) may be assigned a counter that is initialized to a start value upon the neuromorphic state generating a signal, and may be decremented upon each time step, until being reset upon the neuromorphic state exiting the time window or signaling again. Tracking the timing of signaling of interconnection (e.g., fan-in connections or fan-out connections) of neuromorphic states ensures the ability to perform a delayed causal update at the end of a time window of a pre-synaptic signal.

The weight updater 140 is a learning unit that performs updates to weight values of connection weights between pre-synaptic neuromorphic states and connected post-synaptic neuromorphic states, and stored those weight values back to the weight memory 118. In one embodiment, the weight updater 140 may employ a Spike-timing Dependent Plasticity (STDP) algorithm as is illustrated with reference to FIG. 2, although other learning algorithms are also envisioned. Use of STDP may be particularly attractive for neuromorphic systems due to its locality property: weight adaptation uses information of neighboring neuromorphic states. STDP relies on the relative temporal difference between pre-synaptic and post-synaptic spike events by which to adjust the synaptic weight values between neuromorphic states.

Figure 3:
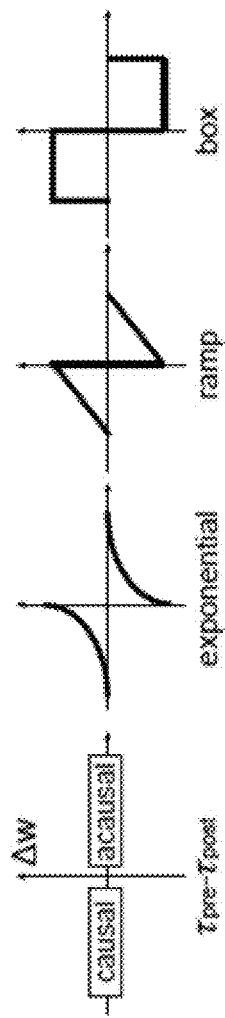
FIG. 3 is a series of graphs illustrating different learning functions to apply to weight values, according to an embodiment of the present disclosure.

In one STDP formulation, the magnitude of weight updates depends on the temporal difference between signals and on the current value of the weight. For simplicity, digital neuromorphic implementations of STDP usually consider a variant of the original STDP where the weight updates are simply a function of the temporal difference. FIG. 3 illustrates three STDP kernels that may be implemented in digital neuromorphic systems, where an STDP kernel is a learning function applied to the granularity of updating a weight value of a connection weight. In the three learning functions, causal events (when pre-synaptic precedes post-synaptic signals) produce weight increase, while acausal events (when post-synaptic precedes pre-synaptic signals) produce weight decrease. While these are the conventions in most current STDP learning systems, envisioned is a convention reversal (between increasing and decreasing weight values).

Figure 2:
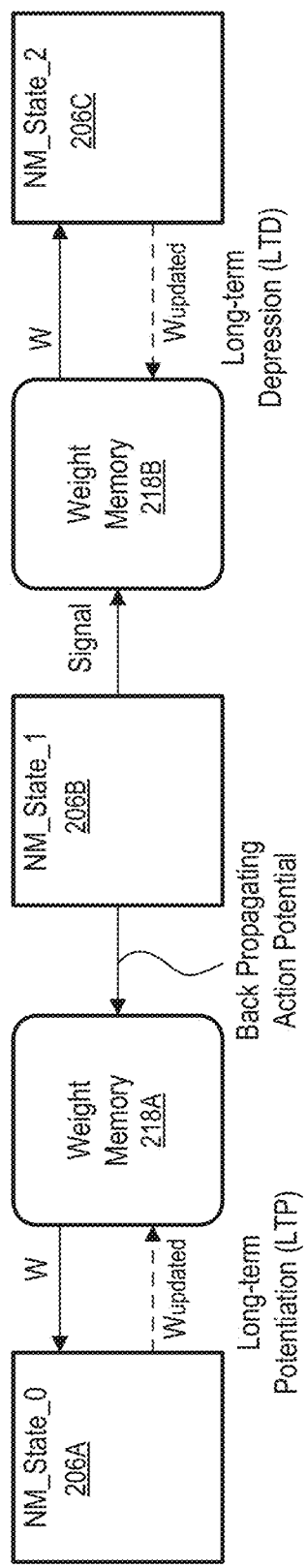
FIG. 2 is a block diagram illustrating use of a Spike-timing Dependent Plasticity (STDP) algorithm for update of interconnected neuromorphic states, according to an embodiment of the present disclosure.

With additional reference to FIG. 2, to illustrate how STDP functions within a limited series of neuromorphic states, there exists a first neuromorphic state 206A with an associated first weight memory 218A, a second neuromorphic state 206B with an associated second weight memory 218B, and a third neuromorphic state 206C. As illustrated, the first neuromorphic state 206A connects to the second neuromorphic state 206B through the first weight memory 218A and the third neuromorphic state 206C connections to the second neuromorphic state 206B through the second weight memory 218B.

In the implementation of STDP algorithms, presynaptic signal (e.g., pre-store signal) arrival a few milliseconds before post-synaptic signaling event leads to long-term potentiation (LTP) of synapses, where the connection gets strengthened. As noted herein above, "synapse" refers to a portion of the weight memory and "synaptic" refers to the position of the neuromorphic weight with respect to its connected neuromorphic states. For example, the second neuromorphic state 206B acts as pre-synaptic neuromorphic state to third neuromorphic state 206C, while the second neuromorphic state 206B acts as post-synaptic neuromorphic state to the first neuromorphic state 206A. Furthermore, pre-synaptic signal arrival occurring after postsynaptic signals leads to long-term depression (LTD) of the same synapse, where the connection gets weakened.

Accordingly, if the first neuromorphic state 206A generates an outgoing data signal at time zero (t0) before the second neuromorphic state 206B is to generate an outgoing data signal at time t0+2, for example, then there is a high probability that the first neuromorphic state 206A will make the second neuromorphic state 206B generate the outgoing data signal, perhaps at t0+1, for example. This sequence of operations is known as LTP. In contrast, if the third neuromorphic state 206C generates an outgoing data signal before the second neuromorphic state 206B generates an outgoing data signal, then the second neuromorphic state 206B has no role to play in causing the third neuromorphic state 206C to generate its outgoing data signal. This sequence of operations is known as LTD. The change in the memory weight values as a function of the relative timing of pre-synaptic and post-synaptic action potentials is called the STDP function or learning window. The rapid change of the STDP function with the relative timing of generated signals suggests the possibility of temporal coding schemes on a millisecond time scale. Temporal coding refers to storing more information to convey in signal timing. For example, an input can be defined by precise signal times, instead of the number of signals needed to represent that input. In such cases, STDP is more useful to implement as a learning algorithm.

With further reference to FIG. 1, the weight updater 140 may update the weight values retrieved from the weight memory 118 for connected post-synaptic neuromorphic states, and store the weight values back to the weight memory using the STDP algorithm, for example. While memristors and phase-change memory may be employed, the weight memory 118 may also employ digital random access memories (RAMs) representing "virtual" synaptic connections between neuromorphic states. These virtual connections may be composed of two tables: the routing table (RT) 145 and the weight table (WT) 150.

In one embodiment, the routing table 145 may be used to store the destination address of newly generated signals indicating to which core inputs the generated signals should be delivered. Furthermore, the weight table 150 may include pairs of synaptic connectivity and strength between input signals (from other post-synaptic neuromorphic states) and their destination post-synaptic neuromorphic states in the processor core 102. Lastly, by organizing the weight table in a specific way inside each processor core, different neuromorphic architectures can be obtained. The most straightforward representation is by means of a crossbar architecture, in which all incoming presynaptic neuromorphic states are connected to all post-synaptic neuromorphic states in a processor core. However, when addressing sparse representations or non-systematic connectivity patterns between neuromorphic states (e.g., each neuromorphic state connects to a different number of neuromorphic states inside the same processor core), a more optimized solution may be to use an index-based architecture as will be discussed.

The signals produced by post-synaptic neuromorphic states are delivered to their destinations (on the same processor core or another processor core in the system 100) according to the core's routing table 145. At the destination processor core, an incoming signal is received by one of its inputs (e.g., over the communication bus 104), which in turn is connected to the post-synaptic neuromorphic states in the processor core via the weight table 150. Therefore, each processor core input line can be interpreted as an axon in neurological terms, capable of communicating to multiple post-synaptic neuromorphic states in the same processor core via synaptic connections.

Figure 4:
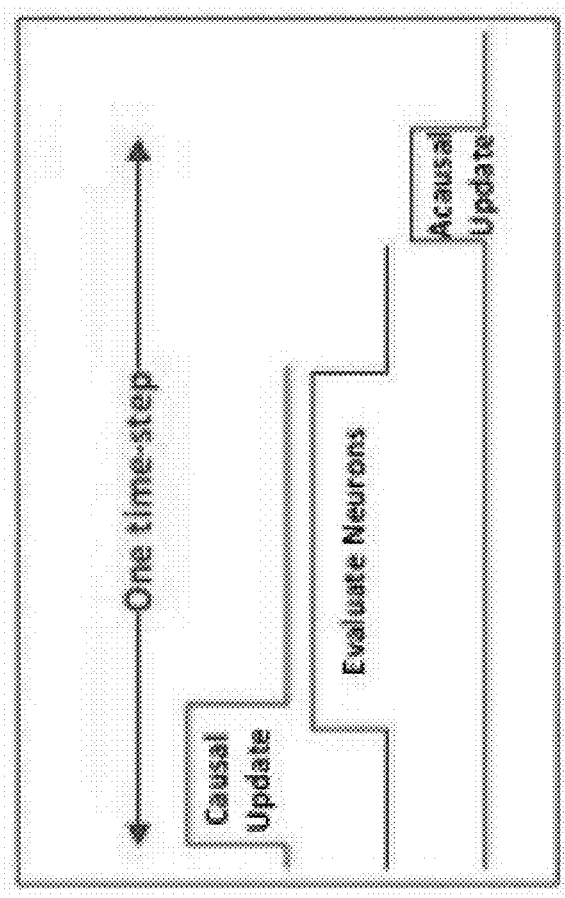
FIG. 4 is a graph illustrating sub-periods of a representative time step that is a period of time used to time updating states and weight values of neuromorphic states.

The neuromorphic computing system 100 may operate in discrete time steps, each of which is defined by a period of clock cycles sufficient to perform state and weight updating for a neuromorphic state. These time steps may be in the order of a millisecond, which is similar to the processing timescale of biological neuromorphic states. At the occurrence of a time step, the processor cores process the inputs which have received a signal, e.g., event-based processing. Analogously, inputs which have not received signals are skipped, reducing processing time and power consumption. With reference to FIG. 4, each time step may be further broken into sub-periods including an acausal update period, an outgoing data signal accumulation period (labeled "evaluate neurons") following the acausal update period, and a causal update period after the outgoing data signal accumulation period. In this way, causal updates may be forced to the latter part of the time step while acausal updates are forced to take place towards the beginning of the time step (with time moving to the left), and signals may be accumulated in the time therebetween. The weight updater 140 may perform the accumulation of incoming data signals for pre-synaptic neuromorphic states by adding associated weight values of connection weights together, which may be used to update weight values of post-synaptic neuromorphic weights that signal during the time window.

The organization of the memory in the weight table 150 defines the type of core memory architecture. The two basic architectures are: crossbar and index-based memory. In the crossbar memory architecture, every connection between an input and a post-synaptic neuromorphic state has a reserved space in the memory, even if the connection is not used in a given ANN. For very dense networks, the crossbar memory architecture may be preferred. On the other hand, for sparser networks, where some connections between neuromorphic states are nonexistent (e.g., of weight zero and will remain this way after STDP learning), or for topologies requiring each neuromorphic state to have different fan-out connections, the index-based architecture may be a better solution.

Figure 5:
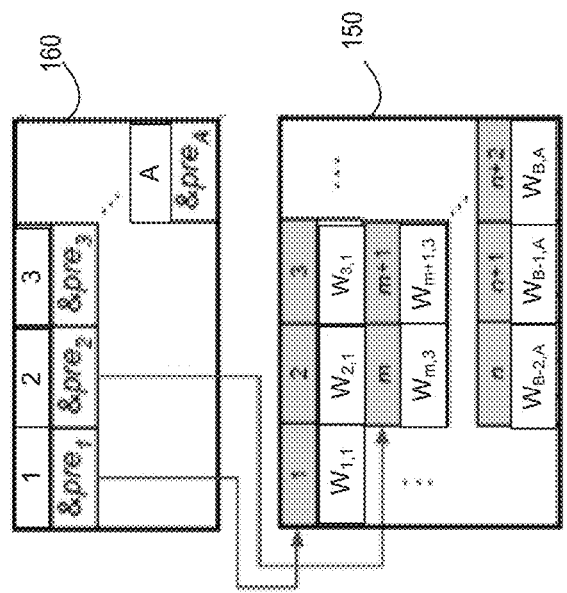
FIG. 5 is a block diagram illustrating a pointer table identifying locations within a weight table of the weight memory of FIG. 1.

FIG. 5 is a block diagram illustrating the pointer table 160 identifying locations within the weight table 150 of the weight memory 118 of FIG. 1. The weight table 150 may include A pre-synaptic neuromorphic states (j) along rows and B post-synaptic neuromorphic states (i) along columns, indexed with a connection weight value ($W_{i,j}$), although the convention between rows and columns may be reversed in another embodiment. Data stored in weight memory of an index-based architecture may be compressed such that only weight table memory for connections that exist in the ANN is used. Similarly, connections that do not exist in the ANN need not take up memory in the weight memory. To provide this flexibility, however, the pointer table 160 is included and associated with the weight table 150. The pointer table 160 may contain a pointer for each core input, e.g., to indicate a starting position for the weight value of the pre-synaptic neuromorphic state in the weight table 150. The weight table 150 in FIG. 5 exemplifies an index-based weight memory 118 with A pre-synaptic inputs indexed against B corresponding post-synaptic neuromorphic states. For example, note the first pre-synaptic input pointer has a line indicating a weight value location within the first row of the weight table 150 and the second pre-synaptic input has a line indicating a weight value location within the second (or a subsequent) row of the weight table 150.

In one embodiment, the neuromorphic computing system 100 may use either type of memory architecture: crossbar or index-based. To implement, the compiler that compiles code for execution by the system 100 efficiently chooses a preferred architecture based on the processor core parameters and ANN topology being mapped, assuming presence of hardware being able to realize both types of memory accesses. The crossbar approach may have the advantage of being able to realize a reverse lookup, which is used with the original STDP algorithm. However, many ANN networks are more efficiently mapped using the index-based approach, which has access only to the forward connectivity. Therefore, as will be seen, the present implementation of STDP can be realized using this forward mapping and still produce results nearly identical to those of the original algorithm.

One aspect of both the crossbar and index-based memory architectures for performing STDP is that a processor core has information about the pre-synaptic neuromorphic state signal times: an event delivered to an input in the processor core carries the temporal information about the pre-synaptic neuromorphic state, independently of where the pre-synaptic neuromorphic state is located in the system. This feature provides the STDP algorithm knowledge of signal times of both the post-synaptic and pre-synaptic neuromorphic states.

In the processor core 102, this may be realized by including an STDP timer for each pre-synaptic neuromorphic state input and each fan-out post-synaptic neuromorphic state, representing the time window discussed previously. The STDP timer may, for example, be implemented with a set of counters, as previously discussed, which likewise implements the event history queue 130 of the processor core 102. The pre-synaptic (input) counter may be initialized at the arrival of a signal form a pre-synaptic neuromorphic state, while post-synaptic counters may be initialized at the generation of a new outgoing signal by post-synaptic neuromorphic states. If the causal and acausal time windows are not symmetric, then a start value of the counter may be set to the longer of the two windows. At each time step of the system 100, the counter may be decremented until reaching zero (or a value greater than zero if the specific window is the shorter of the two), or until the neuromorphic state signals again. This implementation using a counter for each neuromorphic state realizes the nearest-neighbor STDP learning rule that considers the most recent signal events.

FIGS. 6A, 6B, and 6C are block diagrams of a time window during which acausal updates are performed, both causal and acausal updates are performed, and during which causal updates are performed, respectively, according to an embodiment of the present disclosure. In the traditional STDP algorithm, whenever a post-synaptic neuromorphic state generates a signal, the causal weight updates are immediately executed. This is only possible, however, by knowing all the pre-synaptic neuromorphic states to which the specific post-synaptic neuromorphic state is connected to (e.g., by being able to perform reverse lookup access to a connectivity table in weigh memory). Since the index-based memory architecture has access only to forward connectivity, the causal update may be delayed until the pre-synaptic counter is about to expire, as shown in FIG. 6C. In this way, weight updates are performed at the start of or at the end of the pre-synaptic time window tracked by way of its counter. The method proposed herein performs the acausal weight updates at the onset of a pre-synaptic spike as shown in FIG. 6A. This results in simplified signal time storage and reduces memory requirements by using the same STDP window for both causal and acausal updates.

With further reference to FIGS. 6A, 6B, and 6C, the event history queue 138 of a pre-synaptic input ($pre_1$) is represented in the top row, while the event history queue 138 of all the post-synaptic neuromorphic states (post) in the same processor core 102 is represented in the bottom row. The indices ($n_1$, $n_2$ . . . $n_8$) below the bottom row signals represent the post-synaptic neuromorphic state address. The algorithm for the disclosed STDP learning rule may be summarized as follows. With reference to FIG. 6A, when a new pre-synaptic input signal arrives, the weight updater 140 performs the acausal weight updates. With reference to FIG. 6B, if the pre-synaptic counter has not expired as this same pre-synaptic input receives a new signal, the weight updater 140 performs the causal weight updates, followed by the acausal updates. And, with reference to FIG. 6C, when the pre-synaptic counter expires, the weight updater 140 performs the causal weight updates.

With more specificity, and with further reference to FIG. 6A, upon a new event at pre-synaptic input ($pre_1$), the weight updater 140 performs the acausal updates by sweeping through entries for the input pre-synaptic neuromorphic state in the weight table 150 using forward lookup (e.g., for $n_1$, $n_2$, $n_3$) and updating the weight values between all its post-synaptic neuromorphic states that signaled in a preceding (e.g., acausal) time window. Those that signaled in a preceding time window may be determined when using counters by checking which of the fan-out, post-synaptic neuromorphic states present counters greater than zero.

If, however, the counter for the pre-synaptic neuromorphic state ($pre_1$) is greater than zero and the pre-synaptic neuromorphic state signals again, as illustrated in FIG. 6B, then the weight updater 140 may first perform the causal updates between the pre-synaptic and post-synaptic neuromorphic states (e.g., at addresses $n_3$, $n_4$, $n_5$) that signaled after $pre_1$(old), followed by the acausal updates for the post-neuromorphic states that signaled before the second incoming signal, $pre_1$(new), for the pre-synaptic neuromorphic state. The causal updates shown FIG. 6C occur in a similar fashion, e.g., to connection weights of the post-neuromorphic states that follow the pre-synaptic neuromorphic state signal, except timed for when the counter of pre-synaptic neuromorphic state is about to expire (e.g., is about to leave the time window when the counter is equal to one ("1")).

Accordingly, the proposed method delays the causal weight updates since the causal weight updates occur at the end of the pre-synaptic counters, e.g., just prior to expiration of the counter. Nonetheless, this effect on the convergence of the learning rule can be mediated by choosing small enough learning rates. In summary, in the case when a pre-synaptic input event has already entered the time window, and was followed by a post-synaptic spike, no updates should occur between the input and this neuromorphic state until the pre-synaptic input counter is about to expire. If, however, the post-synaptic neuromorphic state signals again while its timer is greater than zero, the "old" post-synaptic spike would be overwritten by the new one when its counter is reinitialized. With this action, the causal update of the pre-synaptic input with the first (e.g., nearest neighbor) post-synaptic spike would be lost.

A rather costly solution to still performing nearest-neighbor causal updates with rapid-signaling post-synaptic neuromorphic states is to search every pre-synaptic input having a counter greater than zero yet smaller than the time window of the post-synaptic neuromorphic state of interest. Searching the weight table 150 for each of these inputs to verify if they are connected to the specific post-synaptic neuromorphic state may be time consuming. The worst case time expenditure for this scenario is the "number of presynaptic neuromorphic state inputs" multiplied by the "number of fan-out postsynaptic neuromorphic states." A more objective solution is to ignore these updates altogether when considering that a single pre-synaptic signal should not have a strong causal relation to a post-synaptic neuromorphic state which is signaling very frequently. As will be discussed in obtained results, this can indeed be considered. Another solution may be to set the refractory period for the neuromorphic states in the system 100 to a period of at least a number of time steps defined by the time window. The refractory period is defined by a minimum number of time steps between generating outgoing data signals for any given neuromorphic state. This would, therefore, impede a bursting behavior, and neuromorphic states would not be able to signal more than once during the time window.

For validation of the disclosed STDP-variant algorithm, a 64-input by 64-neuron core, operating at 1 millisecond (ms) time steps, on a Xilinx Spartan-6 FPGA was employed for testing purposes. The emulation parameters were chosen to match that of biological scale. The anti-symmetric ramp STDP kernel illustrated in FIG. 3, with causal and acausal time windows, $T_{stdp}$, of 20 ms each and max($\Delta w$)=1, was used for learning. The 4096 nine-bit weights were initialized to value zero ("0"). Poisson spike trains with signaling rate of 10 Hz and refractory period, $T_{ref}$, varying between 5 ms and 20 ms were used to externally produce the pre-synaptic and post-synaptic signals. The system 100 was run for 60 seconds, after which the weight values obtained from the FPGA 78A, 7B, 7C, and 7D illustrate the evolution of training with the original algorithm (upper plotted line) and the disclosed proposed method (lower plotted line) for a single synapse, with varying refractory periods. FIGS. 7B, 7C, and 7D illustrate that, as the refractory period approximates the duration of the causal and acausal windows, both algorithms converge.

After running the system, using $T_{ref}$=5 ms, for 60 seconds, the final weight values produced by both algorithms were also compared. In FIG. 8, fine dots 807 represent pairs ($w_o$; $w_p$) of weights produced by the original STDP algorithm ($w_o$) versus those produced by the FPGA ($w_p$) after training. The dashed line 803 is the ideal scenario, where both methods match. FIG. 8 illustrates that the disclosed method produces slightly more negative weights, due to not performing the nearest-neighbor causal updates for postsynaptic neuromorphic states signaling in rapid succession in the FPGA implementation. However, as seen in the histogram 811 in FIG. 8, final weights with smaller difference between the ideal case and the disclosed method are much more frequent, and final weights with a difference larger than −3 seldom occur.

Figure 9:
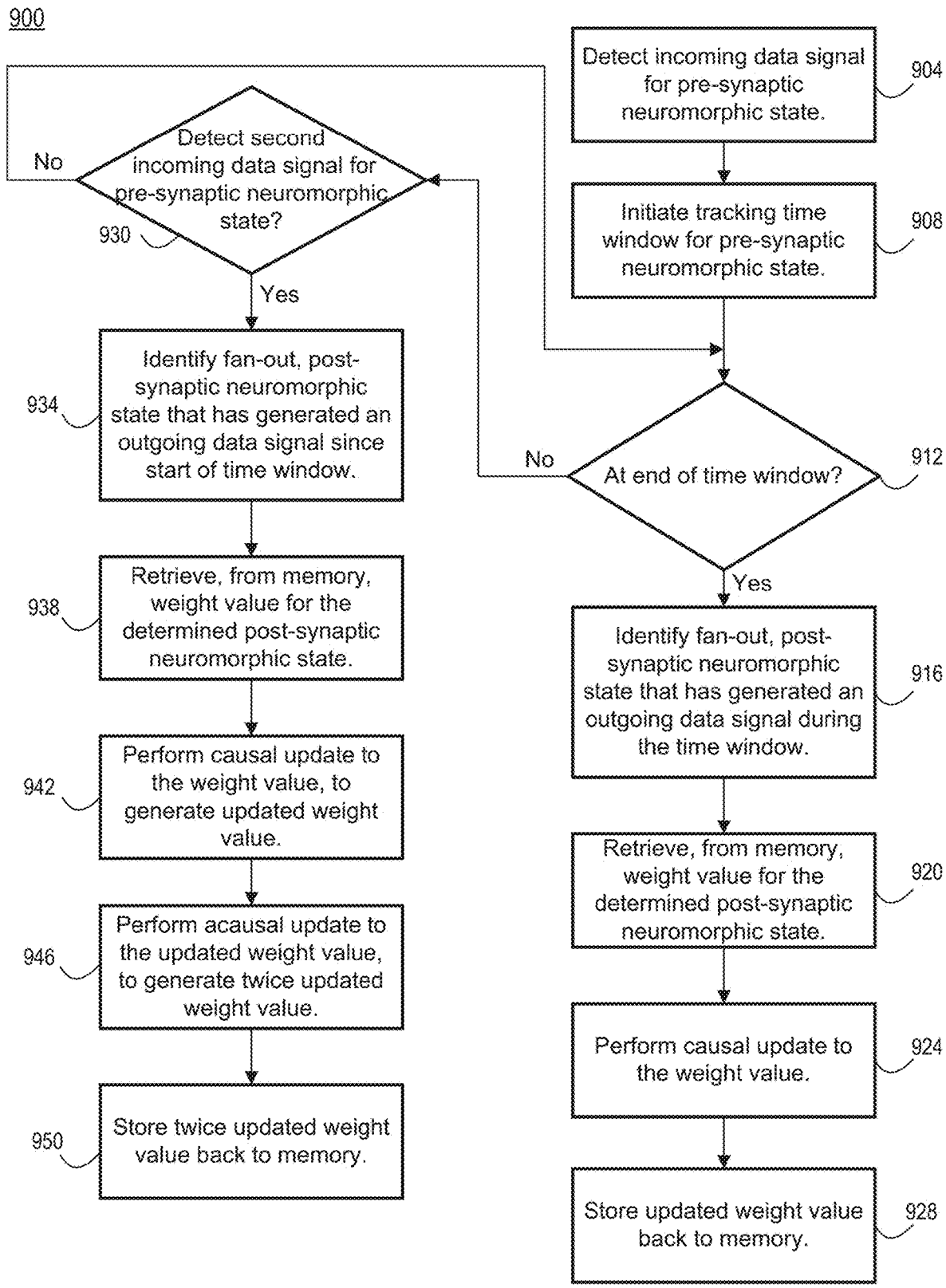
FIG. 9 is a flow chart of a method for performing pre-synaptic learning using delayed causal updates, according to an embodiment of the present disclosure.

FIG. 9 is a flow chart 900 of a method for performing pre-synaptic learning using delayed causal updates, according to an embodiment of the present disclosure. The method 900 may be performed by a processor such as the processor core 102 of FIG. 1, or by an integrated circuit or a system on a chip (SoC). In one embodiment, the processor core 102 is a core that supports multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The method 900 may begin with the processor core detecting an incoming data signal for a pre-synaptic neuromorphic state (904). The method may continue with the processor core initiating a time window for the pre-synaptic neuromorphic state in response to detecting the incoming data signal (908). Initiating the time window may be performed, for example, by setting a counter to a start value. The method 900 may continue with the processor core determining whether the time window is at an end (912). This determination may be made when the counter is equal to one, and thus is at a final time step of the time window. If the answer yes, the method 900 may continue with the processor core identifying fan-out, post-synaptic neuromorphic state that has generated an outgoing data signal during the time window (916). The identification may be made by determining the neuromorphic states for which an associated counter is non-zero. The method 900 may continue with the processor core retrieving, from a weight memory, a weight value for the identified post-synaptic neuromorphic state (920). The method 900 may continue with the processor core performing a causal update to the weight value according to a learning function (such as illustrated in FIG. 3), to generate an updated weight value (924). The method 900 may continue with the processor core storing an updated weight value back to the memory (928). Blocks 916 through 928 of the method 900 may be repeated for an additional post-neuromorphic state that generated an out-going data signal during the time period. If, however, the post-neuromorphic state generated a second outgoing data signal during the data signal, the method 900 may ignore this second outgoing data signal in one embodiment.

At block 912, in responsive to not yet arriving at the end of the time window, the method 900 may continue with the processor core determining whether a second incoming data signal for the pre-synaptic neuromorphic state is detected (930). If the answer is no, the method 900 may loop back to block 912 and continue monitoring for the end of the time window. If the answer is yes, the method 900 may continue with the processor core determining a fan-out, post-synaptic neuromorphic state that has generated an outgoing data signal since the start of the time window (934). The method 900 may continue with the processor core retrieving, from the weight memory, a weight value for the identified post-synaptic neuromorphic state (938). The method 900 may continue with the processor core performing a causal update to the weight value according to a learning function, to generate an updated weight value (946). The method 900 may continue with the processor core next performing an acausal update to the updated weight value according to the learning function, to generate a twice updated weight value (946). The method 900 may continue with the processor core storing the twice updated weight value back to the weight memory (950). Blocks 934 through 960 may be repeated for an additional post-neuromorphic state that generated an out-going data signal during the time period. If, however, the post-neuromorphic state generated a second outgoing data signal during the data signal, the method 900 may ignore this second outgoing data signal in one embodiment.

FIG. 10A is a block diagram illustrating a micro-architecture for a processor 1000 to perform operations of the processor cores 102, 102A, 102B, . . . 102n of FIG. 1. Specifically, processor 1000 depicts an in-order architecture core and a register renaming logic, out-of-order issue/execution logic to be included in a processor according to at least one embodiment of the disclosure. The embodiments of the processor core 102 of FIG. 1 can be implemented by the processor 1000.

Processor 1000 includes a front end unit 1030 coupled to an execution engine unit 1050, and both are coupled to a memory unit 1070. The processor 1000 may include a reduced instruction set computing (RISC) core, a complex instruction set computing (CISC) core, a very long instruction word (VLIW) core, or a hybrid or alternative core type. As yet another option, processor 1000 may include a special-purpose core, such as, for example, a network or communication core, compression engine, graphics core, or the like. In one embodiment, processor 1000 may be a multi-core processor or may be part of a multiprocessor system.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations (RS), central instruction window, etc. The scheduler unit(s) 1056 is coupled to the physical register set(s) unit(s) 1058. Each of the physical register set(s) units 1058 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 1058 is overlapped by the retirement unit 1054 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register set(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1056, physical register set(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which may include a data prefetcher 1080, a data TLB unit 1072, a data cache unit (DCU) 1074, and a level 2 (L2) cache unit 1076, to name a few examples. In some embodiments DCU 1074 is also known as a first level data cache (L1 cache). The DCU 1074 may handle multiple outstanding cache misses and continue to service incoming stores and loads. It also supports maintaining cache coherency. The data TLB unit 1072 is a cache used to improve virtual address translation speed by mapping virtual and physical address spaces. In one exemplary embodiment, the memory access units 1064 may include a load unit, a store address unit, and a store data unit, each of which is coupled to the data TLB unit 1072 in the memory unit 1070. The L2 cache unit 1076 may be coupled to one or more other levels of cache and eventually to a main memory.

In one embodiment, the data prefetcher 1080 speculatively loads/prefetches data to the DCU 1074 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1000 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 1034, data cache unit 1074, and L2 cache unit 1076 would not generally implement the process described in this disclosure, as generally these cache units use on-die memory that does not exhibit page-locality behavior.

FIG. 10B is a block diagram illustrating an in-order pipeline and a register renaming stage, out-of-order issue/execution pipeline implemented by processor 1000 of FIG. 10A according to some embodiments of the disclosure. The solid lined boxes in FIG. 10B illustrate an in-order pipeline, while the dashed lined boxes illustrates a register renaming, out-of-order issue/execution pipeline. In FIG. 10B, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024. In some embodiments, the ordering of stages 1002-1024 may be different than illustrated and are not limited to the specific ordering shown in FIG. 10B.

Figure 11:
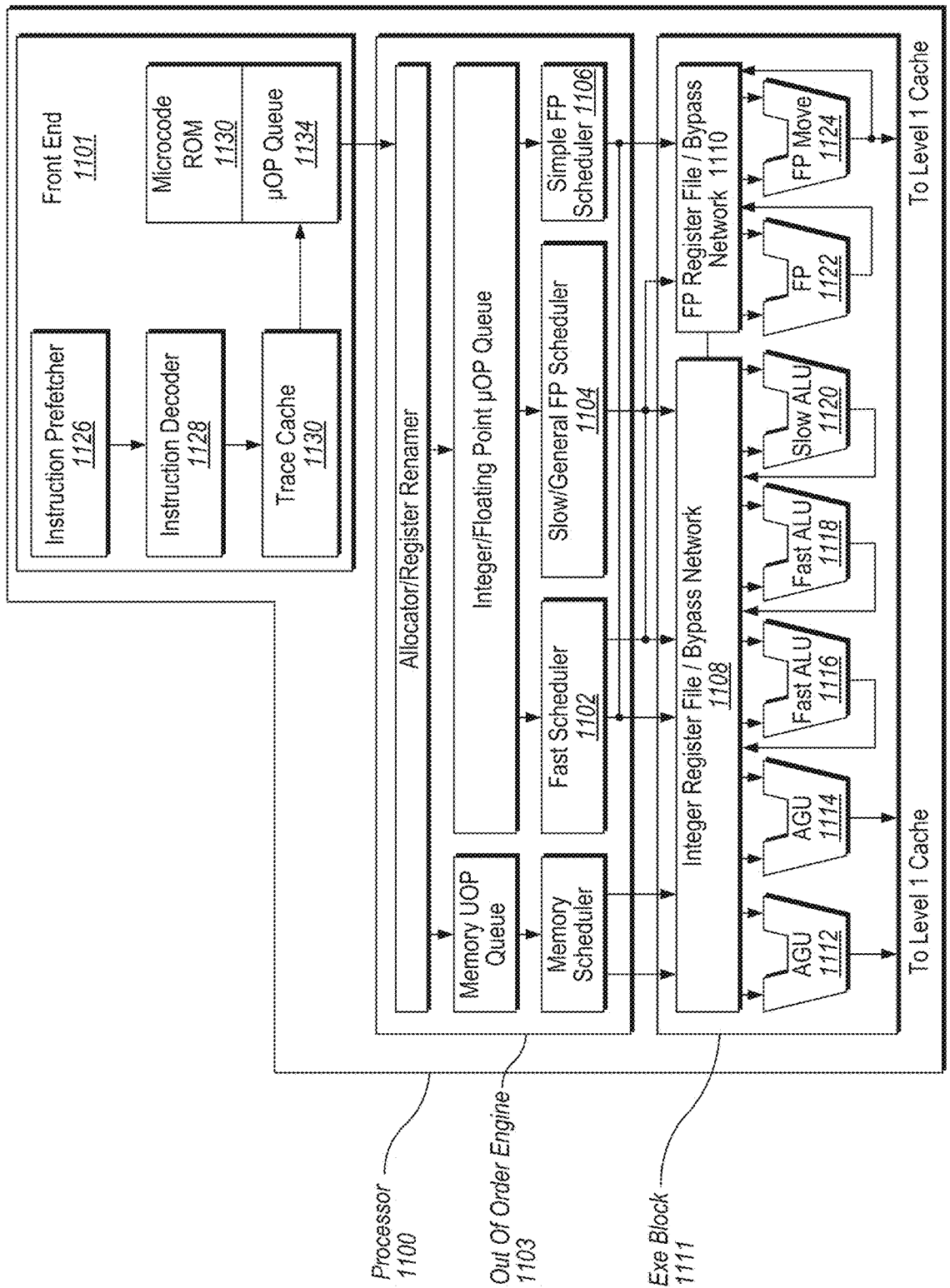
FIG. 11 illustrates a block diagram of the micro-architecture for a processor that includes logic circuits to perform at least some operations of the processor core of FIG. 1.

FIG. 11 illustrates a block diagram of the micro-architecture for a processor 1100 that includes logic circuits that may be used to perform operations of the processor cores 102, 102A, 102B, . . . 102n of FIG. 1, according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The embodiments of the page additions and content copying can be implemented in processor 1100.

The front end 1101 may include several units. In one embodiment, the instruction prefetcher 1116 fetches instructions from memory and feeds them to an instruction decoder 1118 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1130 takes decoded uops and assembles them into program ordered sequences or traces in the uop queue 1134 for execution. When the trace cache 1130 encounters a complex instruction, microcode ROM (or RAM) 1132 provides the uops needed to complete the operation.

Some instructions are converted into a single micro-op, whereas others need several micro-ops to complete the full operation. In one embodiment, if more than four micro-ops are needed to complete an instruction, the decoder 1118 accesses the microcode ROM 1132 to do the instruction. For one embodiment, an instruction can be decoded into a small number of micro ops for processing at the instruction decoder 1118. In another embodiment, an instruction can be stored within the microcode ROM 1132 should a number of micro-ops be needed to accomplish the operation. The trace cache 1130 refers to an entry point programmable logic array (PLA) to determine a correct micro-instruction pointer for reading the micro-code sequences to complete one or more instructions in accordance with one embodiment from the micro-code ROM 1132. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1102, slow/general floating point scheduler 1104, and simple floating point scheduler 1106. The uop schedulers 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register sets 1108, 1110, sit between the schedulers 1102, 1104, 1106, and the execution units 1112, 1114, 1116, 1118, 1120, 1122, 1124 in the execution block 1111. There is a separate register set 1108, 1110, for integer and floating point operations, respectively. Each register set 1108, 1110, of one embodiment also includes a bypass network that can bypass or forward just completed results that have not yet been written into the register set to new dependent uops. The integer register set 1108 and the floating point register set 1110 are also capable of communicating data with the other. For one embodiment, the integer register set 1108 is split into two separate register sets, one register set for the low order 32 bits of data and a second register set for the high order 32 bits of data. The floating point register set 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register sets 1108, 1110, that store the integer and floating point data operand values that the micro-instructions need to execute. The processor 1100 of one embodiment is comprised of a number of execution units: address generation unit (AGU) 1112, AGU 1114, fast ALU 1116, fast ALU 1118, slow ALU 1110, floating point ALU 1112, floating point move unit 1114. For one embodiment, the floating point execution blocks 1112, 1114, execute floating point, MMX, SIMD, and SSE, or other operations. The floating point ALU 1112 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1122, 1124. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1122, 1124, can be implemented to support a range of operands having bits of various widths. For one embodiment, the floating point units 1122, 1124, can operate on 128 bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 12:
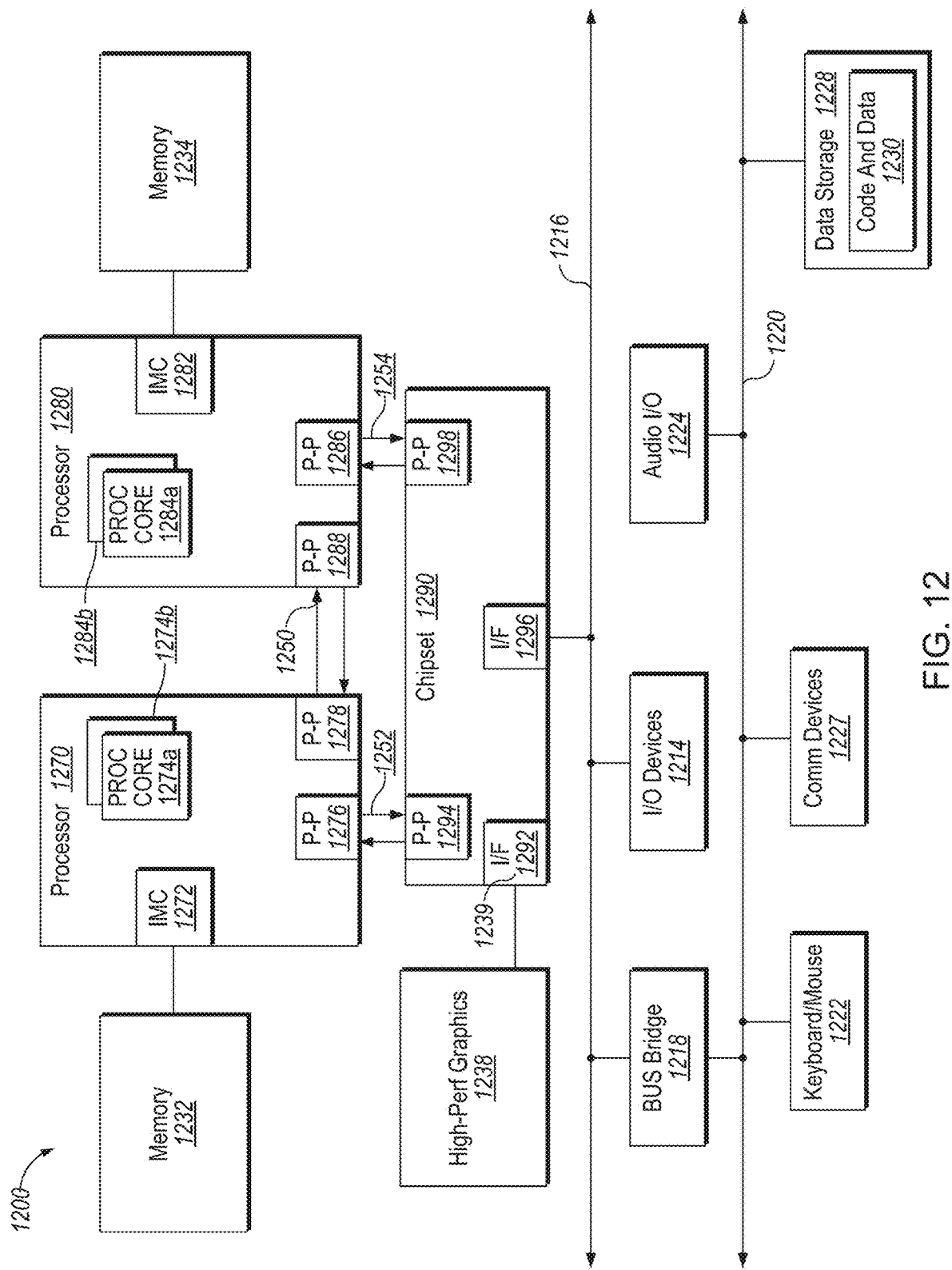
FIG. 12 is a block diagram of a computer system according to one implementation.

Embodiments may be implemented in many different system types. Referring now to FIG. 12, shown is a block diagram of a multiprocessor system 1200 in accordance with an implementation. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be multicore processors, including first and second processor cores (i.e., processor cores 1274a and 1274b and processor cores 1284a and 1284b), although potentially many more cores may be present in the processors.

While shown with two processors 1270, 1280, it is to be understood that the scope of the present disclosure is not so limited. In other implementations, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1288; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1239.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 1290 may be coupled to a first bus 1216 via an interface 1296. In one embodiment, first bus 1216 may be a Peripheral Component Interconnect (PCI) bus, or a bus such as a PCI Express bus or interconnect bus, although the scope of the present disclosure is not so limited.

Figure 13:
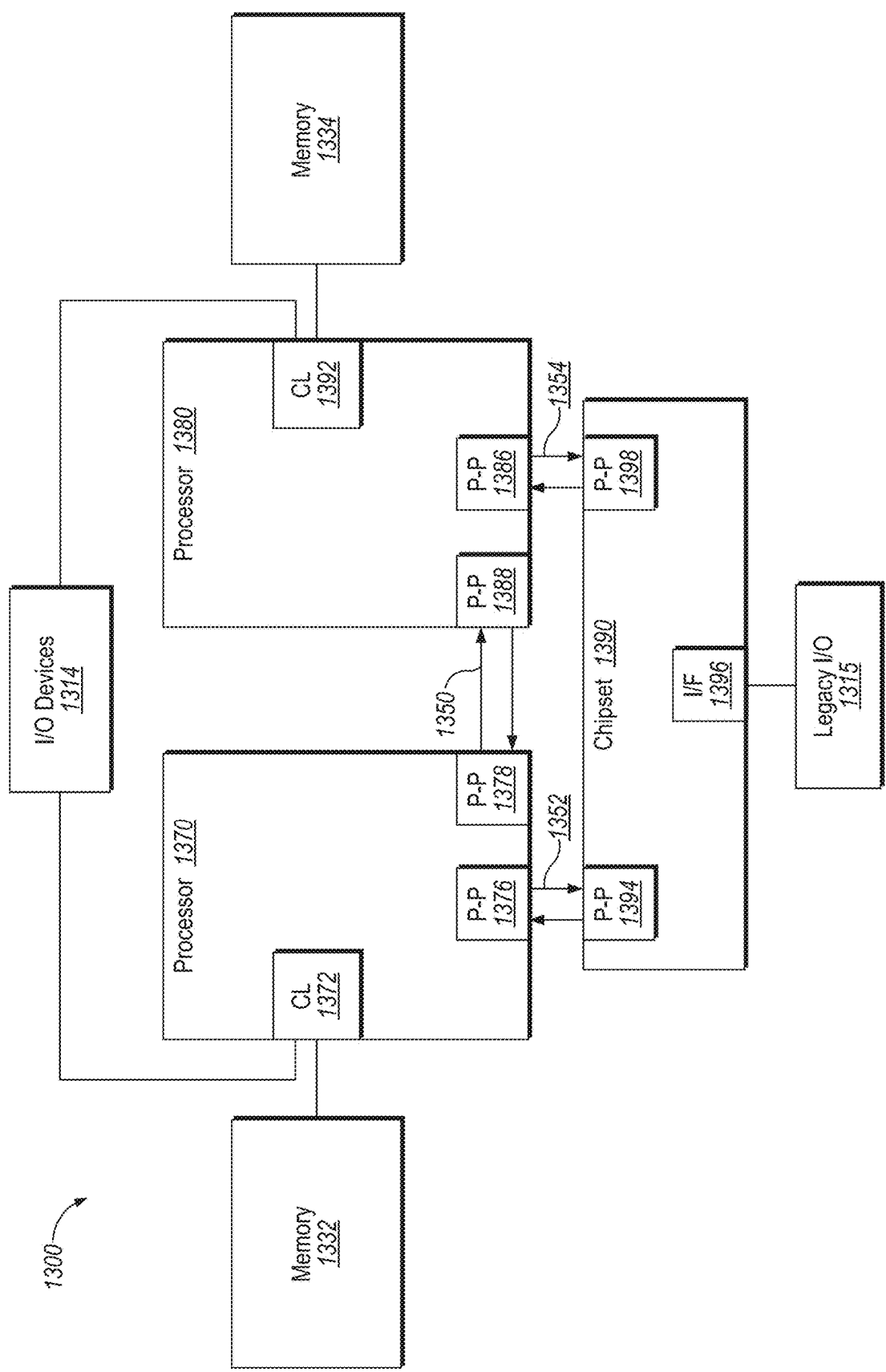
FIG. 13 is a block diagram of a computer system according to another implementation.

Referring now to FIG. 13, shown is a block diagram of a third system 1000 in accordance with an embodiment of the present disclosure. Like elements in FIGS. 12 and 13 bear like reference numerals, and certain aspects of FIG. 13 have been omitted from FIG. 12 in order to avoid obscuring other aspects of FIG. 13.

FIG. 13 illustrates that the processors 1370, 1380 may include integrated memory and I/O control logic ("CL") 1372 and 1392, respectively. For at least one embodiment, the CL 1372, 1382 may include integrated memory controller units such as described herein. In addition. CL 1372, 1392 may also include I/O control logic. FIG. 13 illustrates that the memories 1332, 1334 are coupled to the CL 1372, 1392, and that I/O devices 1314 are also coupled to the control logic 1372, 1392. Legacy I/O devices 1315 are coupled to the chipset 1390.

Figure 14:
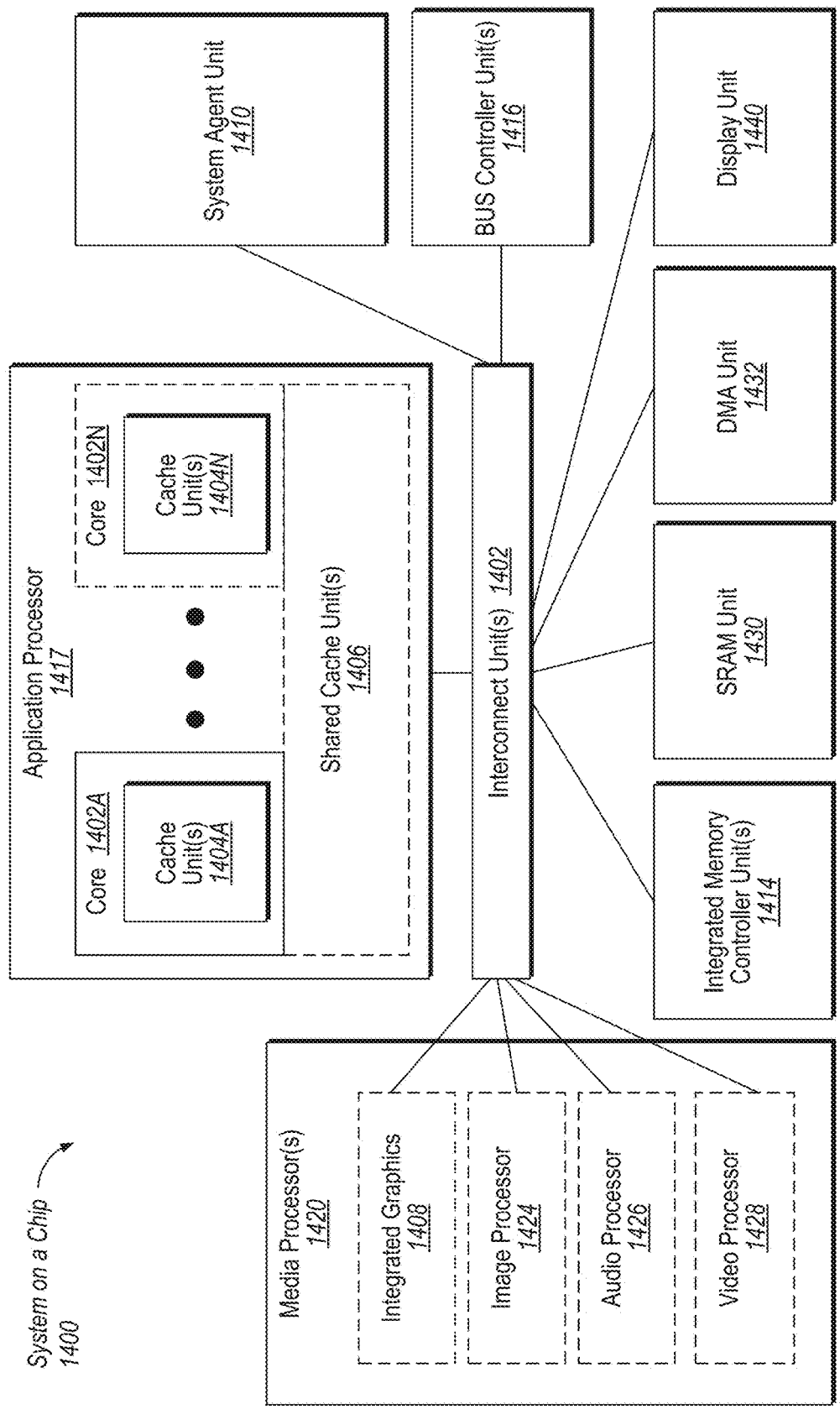
FIG. 14 is a block diagram of a system-on-a-chip according to one implementation.

FIG. 14 is an exemplary system on a chip (SoC) 1400 that may include one or more of the cores 1402. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1400 of FIG. 14, dashed lined boxes are features on more advanced SoCs. An interconnect unit(s) 1402 may be coupled to: an application processor 1417 which includes a set of one or more cores 1402A-N and shared cache unit(s) 1406; a system agent unit 1410; a bus controller unit(s) 1416; an integrated memory controller unit(s) 1414; a set or one or more media processors 1420 which may include integrated graphics logic 1408, an image processor 1424 for providing still and/or video camera functionality, an audio processor 1426 for providing hardware audio acceleration, and a video processor 1428 for providing video encode/decode acceleration; a static random access memory (SRAM) unit 1430; a direct memory access (DMA) unit 1432; and a display unit 1440 for coupling to one or more external displays.

Figure 15:
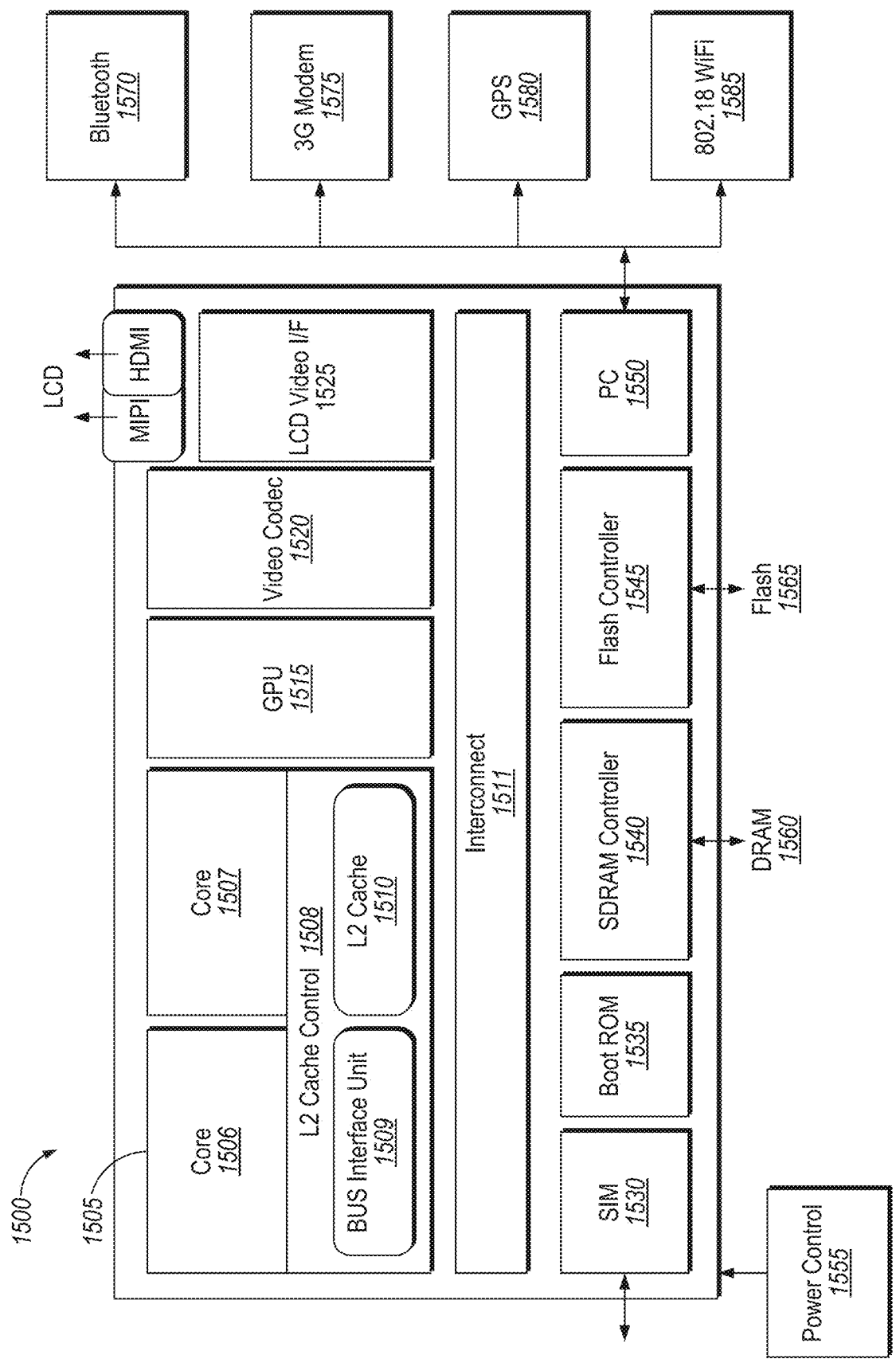
FIG. 15 illustrates another implementation of a block diagram for a computing system.

Turning next to FIG. 15, an embodiment of a system on-chip (SoC) design in accordance with embodiments of the disclosure is depicted. As an illustrative example, SoC 1500 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1500.

Here, SoC 1500 includes 2 cores—1506 and 1507. Similar to the discussion above, cores 1506 and 1507 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1506 and 1507 are coupled to cache control 1508 that is associated with bus interface unit 1509 and L2 cache 1510 to communicate with other parts of system 1500. Interconnect 1511 includes an on-chip interconnect, such as an IOSF, AMBA, or other interconnects discussed above, which can implement one or more aspects of the described disclosure.

In one embodiment, SDRAM controller 1540 may connect to interconnect 1511 via cache 125. Interconnect 1511 provides communication channels to the other components, such as a Subscriber Identity Module (SIM) 1530 to interface with a SIM card, a boot ROM 1535 to hold boot code for execution by cores 1506 and 1507 to initialize and boot SoC 1500, a SDRAM controller 1540 to interface with external memory (e.g. DRAM 1560), a flash controller 1545 to interface with non-volatile memory (e.g. Flash 1565), a peripheral control 1550 (e.g. Serial Peripheral Interface) to interface with peripherals, video codecs 1520 and Video interface 1525 to display and receive input (e.g. touch enabled input), GPU 1515 to perform graphics related computations, etc. Any of these interfaces may incorporate aspects of the embodiments described herein.

In addition, the system illustrates peripherals for communication, such as a Bluetooth® module 1570, 3G modem 1575, GPS 1580, and Wi-Fi® 1585. Note as stated above, a UE includes a radio for communication. As a result, these peripheral communication modules may not all be included. However, in a UE some form of a radio for external communication should be included.

Figure 16:
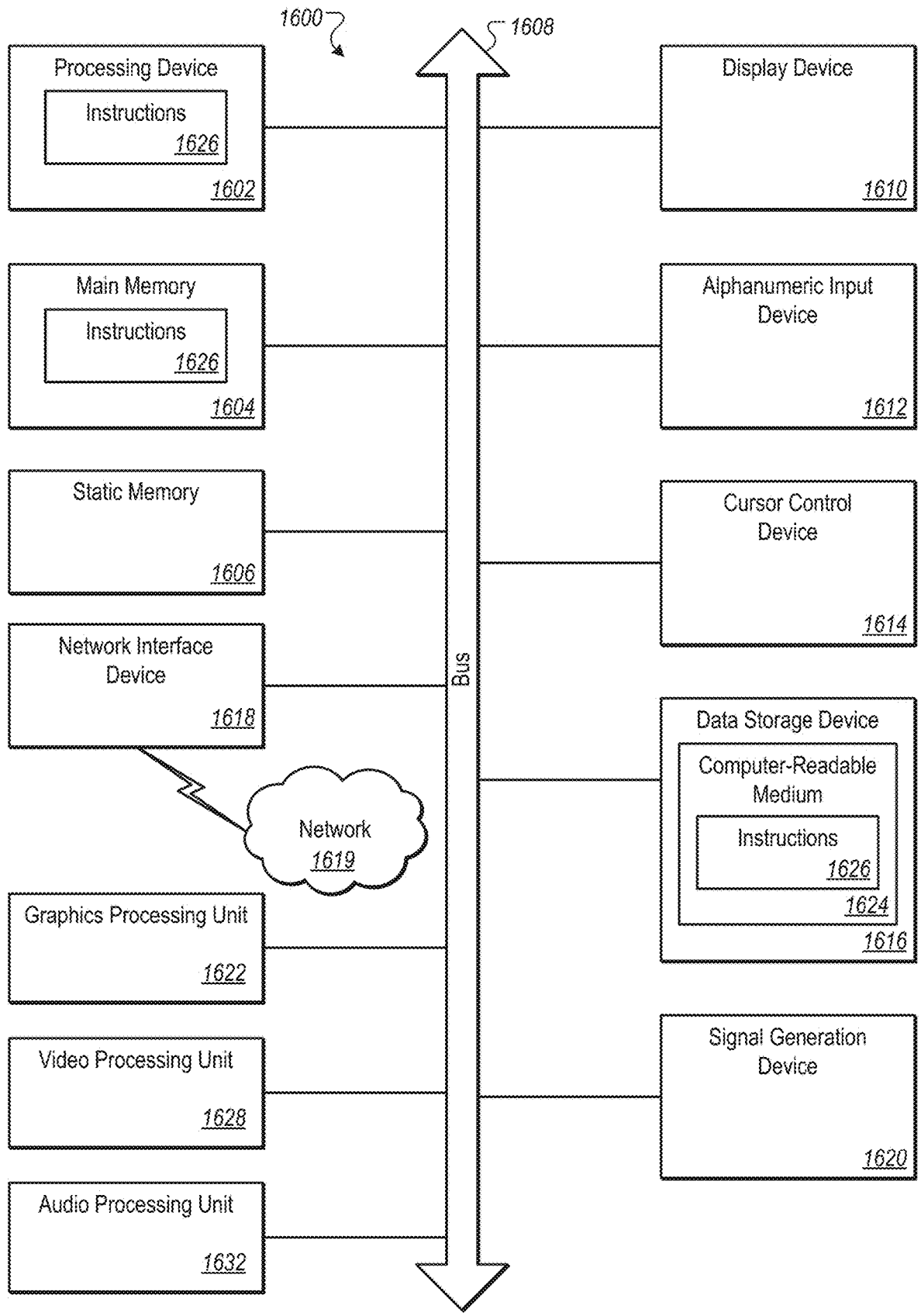
FIG. 16 illustrates another implementation of a block diagram for a computing system.

FIG. 16 illustrates a diagrammatic representation of a machine in the example form of a computing system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1600.

The computing system 1600 includes a processing device 1602, main memory 1604 (e.g., flash memory, dynamic random access memory (DRAM) (such as synchronous DRAM (SDRAM) or DRAM (RDRAM), etc.), a static memory 1606 (e.g., flash memory, static random access memory (SRAM), etc.), and a data storage device 1618, which communicate with each other via a bus 1608. In one embodiment, the bus 1608 may be made up of the system bus 170-1 and/or the memory bus 170-2 of FIG. 1, and the memory and peripheral devices sharing the bus 1608 may be or work through the system agent 114 similar to as discussed with reference to FIG. 1.

Processing device 1602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. In one embodiment, processing device 1602 may include one or processor cores. The processing device 1602 is configured to execute the processing logic 1626 for performing the operations discussed herein.

In one embodiment, processing device 1602 can be part of the computing system 100 of FIG. 1. Alternatively, the computing system 1600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1618 communicably coupled to a network 1619. The computing system 1600 also may include a video display device 1610 (e.g., a liquid crystal display (LCD) or a cathode ray tube (CRT)), an alphanumeric input device 1610 (e.g., a keyboard), a cursor control device 1614 (e.g., a mouse), a signal generation device 1620 (e.g., a speaker), or other peripheral devices. Furthermore, computing system 1600 may include a graphics processing unit 1622, a video processing unit 1628 and an audio processing unit 1632. In another embodiment, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1618 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic during execution thereof by the computing system 1600; the main memory 1604 and the processing device 1602 also constituting computer-readable storage media.

The computer-readable storage medium 1624 may also be used to store instructions 1626 utilizing the processing device 1602, such as described with respect to FIGS. 1 and 2, and/or a software library containing methods that call the above applications. While the computer-readable storage medium 1624 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) a memory to store weight values for a plurality neuromorphic states; and 2) a circuitry coupled to the memory, the circuitry to: a) detect an incoming data signal for a pre-synaptic neuromorphic state; b) initiate a time window for the pre-synaptic neuromorphic state in response to detecting the incoming data signal; and c) responsive to detecting an end of the time window: d) retrieve, from the memory, a weight value for a post-synaptic neuromorphic state for which an outgoing data signal is generated during the time window, the post-synaptic neuromorphic state being a fan-out connection of the pre-synaptic neuromorphic state; e) perform a causal update to the weight value, according to a learning function, to generate an updated weight value; and f) store the updated weight value back to the memory.

In Example 2, the processor of Example 1, wherein to perform the causal update is to increase the weight value according to the learning function.

In Example 3, the processor of Example 1, further comprising 1) a set of counters coupled to the circuitry, the set of counters including: 2) a first counter associated with the pre-synaptic neuromorphic state to track passage of time steps through the time window; and 3) a second counter associated with the post-synaptic neuromorphic state, wherein the circuitry is further to detect generation of the outgoing data signal by detecting that the second counter is non-zero.

In Example 4, the processor of Example 1, wherein, responsive to detecting the end of the time window, the circuitry further to: a) retrieve, from the memory, a second weight value for a second post-synaptic neuromorphic state for which a second outgoing data signal is generated during the time window, the second post-synaptic neuromorphic state also being a fan-out connection of the pre-synaptic neuromorphic state; b) perform a causal update to the second weight value according to the learning function, to generate an updated second weight value; and c) store the updated second weight value back to the memory.

In Example 5, the processor of Example 1, wherein the weight values in the memory are indexed within a weight table according to pre-synaptic neuromorphic states and corresponding post-synaptic neuromorphic states.

In Example 6, the processor of Example 5, wherein the memory is further to store a pointer table comprising a plurality of pointers, each pointer to identify a starting position of a pre-synaptic neuromorphic state within the weight table.

In Example 7, the processor of Example 1, wherein, in response to detecting the incoming data signal for the pre-synaptic neuromorphic state, the circuitry further to: a) retrieve, from the memory, a second weight value for a second post-synaptic neuromorphic state for which an outgoing data signal is generated during a preceding time window, the second post-synaptic neuromorphic state being a fan-out connection of the pre-synaptic neuromorphic state; b) perform an acausal update to the second weight value according to the learning function, to generate an updated second weight value; and c) store the updated second weight value back to the memory.

In Example 8, the processor of Example 1, wherein the circuitry is further to set a refractory period to a period of at least a number of time steps defined by the time window, the refractory period defining a minimum number of time steps between generating the outgoing data signal.

In Example 9, the processor of Example 1, wherein, responsive to detecting, during the time window, generation of a second outgoing data signal for the post-synaptic neuromorphic state, the circuitry further to ignore the generation of the second outgoing data signal.

Various embodiments may have different combinations of the structural features described above. For instance, all optional features of the computing system described above may also be implemented with respect to the method or process described herein and specifics in the examples may be used anywhere in one or more embodiments.

Example 10 is an integrated circuit comprising: 1) a memory to store weight values for a plurality neuromorphic states; and 2) a circuitry coupled to the memory, the circuitry to: a) detect an incoming data signal for a pre-synaptic neuromorphic state; b) initiate a time window for the pre-synaptic neuromorphic state in response to detecting the incoming data signal; and c) responsive to detecting arrival of a second incoming data signal before an end of the time window: d) retrieve, from the memory, a weight value for a post-synaptic neuromorphic state for which an outgoing data signal is generated during the time window, the post-synaptic neuromorphic state being a fan-out connection of the pre-synaptic neuromorphic state; d) perform a causal update to the weight value according to a learning function, to generate an updated weight value; e) perform an acausal update to the updated weight value according to the learning function, to generate a twice updated weight value; and f) store the twice updated weight value back to the memory.

In Example 11, the integrated circuit of Example 10, wherein to perform the causal update is to increase the weight value according to the learning function, and to perform the acausal update is to decrease the updated weight value according to the learning function.

In Example 12, the integrated circuit of Example 10, further comprising 1) a set of counters coupled to the circuitry, the set of counters including: 2) a first counter associated with the pre-synaptic neuromorphic state to track passage of time steps through the time window; and 3) a second counter associated with the post-synaptic neuromorphic state, wherein the circuitry is further to detect generation of the outgoing data signal by detecting that the second counter is non-zero.

In Example 13, the integrated circuit of Example 12, wherein each time step comprises an acausal update period, an outgoing data signal accumulation period following the acausal update period, and a causal update period following the outgoing data signal accumulation period.

In Example 14, the integrated circuit of Example 10, responsive to detecting arrival of the second incoming data signal before the end of the time window, the circuitry further to: a) retrieve, from the memory, a second weight value for a second post-synaptic neuromorphic state for which a second outgoing data signal is generated during the time window, the second post-synaptic neuromorphic state also being a fan-out connection of the pre-synaptic neuromorphic state; b) perform a causal update to the second weight value according to a learning function, to generate an updated second weight value; c) perform an acausal update to the updated second weight value according to the learning function, to generate a twice updated second weight value; and d) store the twice updated second weight value back to the memory.

In Example 15, the integrated circuit of Example 10, wherein the weight values in the memory are indexed within a weight table according to pre-synaptic neuromorphic states and corresponding post-synaptic neuromorphic states.

In Example 16, the integrated circuit of Example 15, wherein the memory is further to store a pointer table comprising a plurality of pointers, each pointer to identify a starting position of a pre-synaptic neuromorphic state within the weight table.

In Example 17, the integrated circuit of Example 10, wherein, in response to detecting the incoming data signal for the pre-synaptic neuromorphic state, the circuitry further to: a) retrieve, from the memory, a second weight value for a second post-synaptic neuromorphic state for which an outgoing data signal is generated during a preceding time window, the second post-synaptic neuromorphic state being a fan-out connection of the pre-synaptic neuromorphic state; b) perform an acausal update to the second weight value according to the learning function, to generate an updated second weight value; and c) store the updated second weight value back to the memory.

Various embodiments may have different combinations of the structural features described above. For instance, all optional features of the processors and methods described above may also be implemented with respect to a system described herein and specifics in the examples may be used anywhere in one or more embodiments.

Example 18 is a system on a chip (SoC) comprising: 1) a memory to store weight values for a plurality neuromorphic states; and 2) a circuitry coupled to the memory, the circuitry to: a) detect an incoming data signal for a pre-synaptic neuromorphic state; b) initiate a time window for the pre-synaptic neuromorphic state in response to detecting the incoming data signal; and c) responsive to detecting an end of the time window: d) retrieve, from the memory, a weight value for a post-synaptic neuromorphic state for which an outgoing data signal is generated during the time window, the post-synaptic neuromorphic state being a fan-out connection of the pre-synaptic neuromorphic state; e) perform a causal update to the weight value, according to a learning function, to generate an updated weight value; and f) store the updated weight value back to the memory.

In Example 19, the SoC of Example 18, wherein to perform the causal update is to increase the weight value according to the learning function.

In Example 20, the SoC of Example 18, further comprising 1) a set of counters coupled to the circuitry, the set of counters including: 2) a first counter associated with the pre-synaptic neuromorphic state to track passage of time steps through the time window; and 3) a second counter associated with the post-synaptic neuromorphic state, wherein the circuitry is further to detect generation of the outgoing data signal by detecting that the second counter is non-zero.

In Example 21, the SoC of Example 18, wherein, responsive to detecting the end of the time window, the circuitry further to: a) retrieve, from the memory, a second weight value for a second post-synaptic neuromorphic state for which a second outgoing data signal is generated during the time window, the second post-synaptic neuromorphic state also being a fan-out connection of the pre-synaptic neuromorphic state; b) perform a causal update to the second weight value according to the learning function, to generate an updated second weight value; and c) store the updated second weight value back to the memory.

In Example 22, the SoC of Example 18, wherein the circuitry is further to set a refractory period to a period of at least a number of time steps defined by the time window, the refractory period defining a minimum number of time steps between generating the outgoing data signal.

In Example 23, the SoC of Example 18, wherein, responsive to detecting, during the time window, generation of a second outgoing data signal for the post-synaptic neuromorphic state, the circuitry further to ignore the generation of the second outgoing data signal.

In Example 24, the SoC of Example 18, wherein, in response to detecting the incoming data signal for the pre-synaptic neuromorphic state, the circuitry is further to: a) retrieve, from the memory, a second weight value for a second post-synaptic neuromorphic state for which an outgoing data signal is generated during a preceding time window, the second post-synaptic neuromorphic state being a fan-out connection of the pre-synaptic neuromorphic state; b) perform an acausal update to the second weight value according to the learning function, to generate an updated second weight value; and c) store the updated second weight value back to the memory.

Various embodiments may have different combinations of the structural features described above. For instance, all optional features of the processors and methods described above may also be implemented with respect to a system described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a memory to store weight values for a plurality neuromorphic states; and
   a circuitry coupled to the memory, the circuitry to:
   detect an incoming data signal for a pre-synaptic neuromorphic state;
   initiate a time window for the pre-synaptic neuromorphic state in response to detection of the incoming data signal, the time window comprising a plurality of time steps, each time step defined by a number of clock cycles, wherein each time step of the plurality of time steps comprises an acausal update period, an outgoing data signal accumulation period following the acausal update period, and a causal update period following the outgoing data signal accumulation period;
   detect generation of an outgoing data signal during the time window; and
   responsive to detection of an end of the time window:
   retrieve, from the memory, a weight value for a post-synaptic neuromorphic state corresponding to the outgoing data signal, the post-synaptic neuromorphic state being a fan-out connection of the pre-synaptic neuromorphic state;
   perform, in the causal update period of a time step following the end of the time window, a causal update to the weight value, according to a learning function, to generate an updated weight value; and
   store the updated weight value back to the memory.

2. The processor of claim 1, wherein to perform the causal update is to increase the weight value according to the learning function.

3. The processor of claim 1, further comprising a set of counters coupled to the circuitry, the set of counters including:
   a first counter associated with the pre-synaptic neuromorphic state to track passage of the plurality of time steps through the time window; and
   a second counter associated with the post-synaptic neuromorphic state, wherein the circuitry is further to detect the generation of the outgoing data signal by detection of a non-zero value of that the second counter.

4. The processor of claim 1, wherein, responsive to detection of the end of the time window, the circuitry further to:
   retrieve, from the memory, a second weight value for a second post-synaptic neuromorphic state for which a second outgoing data signal is generated during the time window, the second post-synaptic neuromorphic state also being a fan-out connection of the pre-synaptic neuromorphic state;
   perform a causal update to the second weight value according to the learning function, to generate an updated second weight value; and
   store the updated second weight value back to the memory.

5. The processor of claim 1, wherein the weight values in the memory are indexed within a weight table according to pre-synaptic neuromorphic states and corresponding post-synaptic neuromorphic states.

6. The processor of claim 5, wherein the memory is further to store a pointer table comprising a plurality of pointers, each pointer to identify a starting position of a pre-synaptic neuromorphic state within the weight table.

7. The processor of claim 1, wherein, in response to detection of the incoming data signal for the pre-synaptic neuromorphic state, the circuitry further to:
retrieve, from the memory, a second weight value for a second post-synaptic neuromorphic state for which an outgoing data signal is generated during a preceding time window, the second post-synaptic neuromorphic state being a fan-out connection of the pre-synaptic neuromorphic state;
perform an acausal update to the second weight value according to the learning function, to generate an updated second weight value; and
store the updated second weight value back to the memory.

8. The processor of claim 1, wherein the circuitry is further to set a refractory period to a period of at least a number of the plurality of time steps defined by the time window, the refractory period defining a minimum number of time steps between generating the outgoing data signal.

9. The processor of claim 1, wherein, responsive to detection, during the time window, generation of a second outgoing data signal for the post-synaptic neuromorphic state, the circuitry further to ignore the generation of the second outgoing data signal.

10. An integrated circuit comprising:
a memory to store weight values for a plurality neuromorphic states; and
a circuitry coupled to the memory, the circuitry to:
detect an incoming data signal for a pre-synaptic neuromorphic state;
initiate a time window for the pre-synaptic neuromorphic state in response to detecting the incoming data signal, the time window comprising a plurality of time steps, each time step defined by a number of clock cycles, wherein each time step of the plurality of time steps comprises an acausal update period, an outgoing data signal accumulation period following the acausal update period, and a causal update period following the outgoing data signal accumulation period;
detect generation of an outgoing data signal during the time window; and
responsive to detection of an arrival of a second incoming data signal before an end of the time window:
retrieve, from the memory, a weight value for a post-synaptic neuromorphic state corresponding to the outgoing data signal, the post-synaptic neuromorphic state being a fan-out connection of the pre-synaptic neuromorphic state;
perform, during the causal update period, a causal update to the weight value according to a learning function, to generate an updated weight value;
perform, during the acausal update period, an acausal update to the updated weight value according to the learning function, to generate a twice updated weight value; and
store the twice updated weight value back to the memory.

11. The integrated circuit of claim 10, wherein to perform the causal update is to increase the weight value according to the learning function, and to perform the acausal update is to decrease the updated weight value according to the learning function.

12. The integrated circuit of claim 10, further comprising a set of counters coupled to the circuitry, the set of counters including:
a first counter associated with the pre-synaptic neuromorphic state to track passage of the plurality of time steps through the time window; and
a second counter associated with the post-synaptic neuromorphic state, wherein the circuitry is further to detect the generation of the outgoing data signal by detection of a non-zero value of the second counter.

13. The integrated circuit of claim 10, responsive to detection of the arrival of the second incoming data signal before the end of the time window, the circuitry further to:
retrieve, from the memory, a second weight value for a second post-synaptic neuromorphic state for which a second outgoing data signal is generated during the time window, the second post-synaptic neuromorphic state also being a fan-out connection of the pre-synaptic neuromorphic state;
perform a causal update to the second weight value according to a learning function, to generate an updated second weight value;
perform an acausal update to the updated second weight value according to the learning function, to generate a twice updated second weight value; and
store the twice updated second weight value back to the memory.

14. The integrated circuit of claim 10, wherein the weight values in the memory are indexed within a weight table according to pre-synaptic neuromorphic states and corresponding post-synaptic neuromorphic states.

15. The integrated circuit of claim 14, wherein the memory is further to store a pointer table comprising a plurality of pointers, each pointer to identify a starting position of a pre-synaptic neuromorphic state within the weight table.

16. The integrated circuit of claim 10, wherein, in response to dectection of the incoming data signal for the pre-synaptic neuromorphic state, the circuitry further to:
retrieve, from the memory, a second weight value for a second post-synaptic neuromorphic state for which an outgoing data signal is generated during a preceding time window, the second post-synaptic neuromorphic state being a fan-out connection of the pre-synaptic neuromorphic state;
perform an acausal update to the second weight value according to the learning function, to generate an updated second weight value; and
store the updated second weight value back to the memory.

17. A system on a chip (SoC) comprising:
a memory to store weight values for a plurality neuromorphic states; and
a circuitry coupled to the memory, the circuitry to:
detect an incoming data signal for a pre-synaptic neuromorphic state;
initiate a time window for the pre-synaptic neuromorphic state in response to detecting the incoming data signal, the time window comprising a plurality of time steps, each time step defined by a number of clock cycles, wherein each time step of the plurality of time steps comprises an acausal update period, an outgoing data signal accumulation period following the acausal update period, and a causal update period following the outgoing data signal accumulation period;

detect generation of an outgoing data signal during the time window; and responsive to detection of an end of the time window:
retrieve, from the memory, a weight value for a post-synaptic neuromorphic state corresponding to the outgoing data signal, the post-synaptic neuromorphic state being a fan-out connection of the pre-synaptic neuromorphic state;

perform, during the causal update period of a time step following the end of the time window, a causal update to the weight value, according to a learning function, to generate an updated weight value; and store the updated weight value back to the memory.

18. The SoC of claim 17, wherein to perform the causal update is to increase the weight value according to the learning function.

19. The SoC of claim 17, further comprising a set of counters coupled to the circuitry, the set of counters including:
a first counter associated with the pre-synaptic neuromorphic state to track passage of the plurality of time steps through the time window; and
a second counter associated with the post-synaptic neuromorphic state, wherein the circuitry is further to detect the generation of the outgoing data signal by detecting that the second counter is non-zero.

20. The SoC of claim 17, wherein, responsive to detection of the end of the time window, the circuitry further to:
retrieve, from the memory, a second weight value for a second post-synaptic neuromorphic state for which a second outgoing data signal is generated during the time window, the second post-synaptic neuromorphic state also being a fan-out connection of the pre-synaptic neuromorphic state;

perform a causal update to the second weight value according to the learning function, to generate an updated second weight value; and store the updated second weight value back to the memory.

21. The SoC of claim 17, wherein the circuitry is further to set a refractory period to a period of at least a number of the plurality of time steps defined by the time window, the refractory period defining a minimum number of time steps between generating the outgoing data signal.

22. The SoC of claim 17, wherein, responsive to detection of, during the time window, generation of a second outgoing data signal for the post-synaptic neuromorphic state, the circuitry further to ignore the generation of the second outgoing data signal.

23. The SoC of claim 17, wherein, in response to detection of the incoming data signal for the pre-synaptic neuromorphic state, the circuitry is further to:
retrieve, from the memory, a second weight value for a second post-synaptic neuromorphic state for which an outgoing data signal is generated during a preceding time window, the second post-synaptic neuromorphic state being a fan-out connection of the pre-synaptic neuromorphic state;

perform an acausal update to the second weight value according to the learning function, to generate an updated second weight value; and store the updated second weight value back to the memory.

* * * * *